US010855442B2

(12) United States Patent
Enga

(10) Patent No.: US 10,855,442 B2
(45) Date of Patent: *Dec. 1, 2020

(54) EFFICIENT ENCRYPTED DATA MANAGEMENT SYSTEM AND METHOD

(71) Applicant: Craxel, Inc., Chantilly, VA (US)

(72) Inventor: David Enga, Chantilly, VA (US)

(73) Assignee: Craxel, Inc., Chantilly, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/595,601

(22) Filed: Oct. 8, 2019

(65) Prior Publication Data
US 2020/0052878 A1  Feb. 13, 2020

Related U.S. Application Data

(63) Continuation of application No. 15/445,104, filed on Feb. 28, 2017, now Pat. No. 10,469,246.

(60) Provisional application No. 62/301,138, filed on Feb. 29, 2016.

(51) Int. Cl.
| | |
|---|---|
| *H04L 9/06* | (2006.01) |
| *G06F 21/60* | (2013.01) |
| *H04L 9/14* | (2006.01) |
| *H04L 9/30* | (2006.01) |
| *H04L 9/08* | (2006.01) |

(52) U.S. Cl.
CPC .......... *H04L 9/0625* (2013.01); *G06F 21/602* (2013.01); *H04L 9/0819* (2013.01); *H04L 9/14* (2013.01); *H04L 9/30* (2013.01)

(58) Field of Classification Search
CPC ....... H04L 9/0625; H04L 9/0819; H04L 9/14; H04L 9/30; G06F 21/602
See application file for complete search history.

(56) References Cited

U.S. PATENT DOCUMENTS

| | | | | |
|---|---|---|---|---|
| 8,661,329 B1* | 2/2014 | Teper | ...................... | G06F 30/30 |
| | | | | 715/211 |
| 9,292,699 B1* | 3/2016 | Stuntebeck | ............... | H04L 9/14 |
| 9,305,019 B2* | 4/2016 | Enga | ..................... | G06F 16/955 |
| 9,542,118 B1* | 1/2017 | Lercari | .................. | G06F 3/064 |
| 2007/0133806 A1* | 6/2007 | Asano | .................. | H04L 9/0836 |
| | | | | 380/277 |
| 2010/0257372 A1* | 10/2010 | Seifert | .................. | G06F 21/602 |
| | | | | 713/189 |
| 2017/0270138 A1* | 9/2017 | Belov | .................. | G06F 16/137 |

FOREIGN PATENT DOCUMENTS

EP        2717174 A1 *    4/2014    ........... G06F 16/248

* cited by examiner

*Primary Examiner* — Hee K Song
(74) *Attorney, Agent, or Firm* — Culhane Meadows PLLC

(57) ABSTRACT

A method for performing an encrypted data operation may include generating an encrypted hierarchical path identifier corresponding to a hierarchical data space for at least one plaintext data operation that preserves the hierarchy of the hierarchical data space. The at least one plaintext data operation may correspond to at least one subdivision of the hierarchical data space. The method may further include encrypting the at least one plaintext data operation, and sending a request to perform an encrypted data operation to a server. The request may include the encrypted data operation and the encrypted hierarchical path identifier.

39 Claims, 12 Drawing Sheets

FIG. 7

| HPId | Depth | EF(SKey, HPId$_{Depth-1}$,HPId$_{Depth}$) 702 | EncHPid | Depth |
|---|---|---|---|---|
| 0  703 | 0 |  | 0 | 0 |
| 0011........ 704 | 1 | EF(SKey, 0, 011) 705 | 0101........ 706 | 1 |
| 0001110........ | 2 | EF(SKey, 0011, 10) | 0101101........ | 2 |
| 00111010........ | 3 | EF(SKey, 001110, 10) | 01010111........ | 3 |
| 0011101011..... | 4 | EF(SKey, 00111010, 11) | 0101011100..... | 4 |
| 001110101101. | 5 | EF(SKey, 0011101011, 01) | 010101110010. | 5 |

701

EFFICIENT ENCRYPTED DATA MANAGEMENT SYSTEM AND METHOD

CROSS-REFERENCE TO RELATED APPLICATIONS

This application is a continuation of U.S. patent application Ser. No. 15/445,104 filed Feb. 28, 2017, now U.S. Pat. No. 10,469,246 which claims the benefit of U.S. provisional patent application Ser. No. 62/301,138, filed on Feb. 29, 2016, both of which are incorporated herein by reference in their entirety.

FIELD OF THE DISCLOSURE

The present disclosure relates to information security, and more particularly to system for efficient encrypted data management.

BACKGROUND

This section provides context for various embodiments of the invention as recited in the claims. While the content may comprise subject matter that could be used, it has not necessarily been previously used or described. The content described in this section is not considered prior art unless otherwise indicated and should not be considered as admitted prior art due to inclusion in this section.

In general, existing data management and message processing systems do not provide the level of security required to sufficiently protect user information. Typical methods of protecting data utilize encryption of single columns, single data cells or encryption of storage, known as whole disk encryption. These methods require that the encryption keys be present or accessible to the data management server. These keys must be stored on the data management server or brought to the server for any operation requiring decryption of data within the system. This includes almost every useful data operation. Having the encryption keys available on the same servers as the encrypted data is a serious vulnerability. An attacker or insider that gains access to the servers or storage could get the keys and decrypt the encrypted data. Not only are the servers themselves vulnerable, but everywhere that the information is kept is vulnerable. This includes locations such as the server memory, on local disks, in network storage, in backup files, server replicas, and over the network. There are too many known and unknown vulnerabilities to these and other information technology (IT) components to be confident that the data is protected. Therefore, all of these data management system components require extraordinary security measures to ensure that nobody can steal the valuable information. Given the numerous vulnerabilities present in modern operating systems and software, it is incredibly challenging and expensive to secure all of the places that valuable information is kept.

FIG. 1 provides an example of a prior art data management system 100 that co-locates encryption keys with encrypted data. In this partially encrypted, yet insecure, data management system 100, client 101 sends operations and queries to server 102, which includes data engine 103, data indexes 104, storage 106, and backup files 107. The server 102 organizes information by row or column or key/value. The data is protected by encrypting each row, cell, column, or storage. Data indexes 104 are used by data management system 100 to quickly search for information. Data indexes 104 are typically some type of Btree. These data indexes 104 are not encrypted because they cannot be efficiently searched if they are encrypted. Data protection methods such as row, column, and whole storage encryption require that the encryption keys 105 be present on the server 102. Those keys 105 must be either stored on the server 102 or brought to the server 102 for any operation requiring decryption of data within the server 102. Storing encryption keys 105 on the same physical machines as the encrypted data creates a significant vulnerability within the system 100 as any attacker or insider that gains access to the server 102 could find the keys 105, decrypt the data with those keys 105, and steal the information present. For example, since database management system administrators have access to both the encryption keys 105 and the encrypted data, these insiders can steal the encrypted data and decrypt it. Additionally, if the data management system 100 is vulnerable to attackers, the encryption keys 105 may be stolen. Therefore, it is not safe to co-locate encrypted data with their encryption keys 105. However, no encryption system is fast enough to allow for operating on encrypted data without decrypting it. No alternatives have been found that are secure enough and operate quickly enough. A high performance and secure solution to this problem would provide substantial improvements to information security.

SUMMARY

A secure and efficient data management system and related method are disclosed. The secure encrypted data management system may be configured to efficiently and securely operate upon encrypted data stored within a server, without leaking information. For example, the encrypted data may be operated on by the server without the server decrypting the data or knowing the plaintext data structure of the encrypted data stored within the server. According to various embodiments, the system may include one or more clients configured to perform encrypted data operations including storing data or querying data stored on one or more servers. In one example of a storage operation, the client may generate a plaintext hierarchical path identifier for plaintext data by recursively subdividing a plaintext data space and appending a label to the identifier based on which subdivision contains the plaintext data. The client may then encrypt the plaintext hierarchical path identifier to generate an encrypted hierarchical path identifier using an encryption method that preserves the hierarchy of the plaintext data space. The client may also encrypt the plaintext data and send both the encrypted hierarchical path identifier and the associated encrypted data to the server. The server then indexes the encrypted data based on the encrypted hierarchical path identifier. The server does not contain any information regarding the plaintext data or the real location of the plaintext data in the plaintext hierarchical data space. Instead, the server only operates to hold the encrypted data in its indexes based on a node location specified by the encrypted hierarchical path identifier. In one example of a query operation, the client may generate a hierarchical path identifier for the desired data and then encrypt the hierarchical path identifier using the same encryption method. The client may then send the encrypted hierarchical path identifier to the server and request that the server send back encrypted data matching or associated with the encrypted hierarchical path identifier. As described in more detail below and in the accompanying drawings, the server can perform the encrypted data operations without decrypting the encrypted data or encrypted hierarchical path identifier because the hierarchy of the data space is preserved by the hierarchical path identifier encryption method.

In one aspect, a system for implementing an encrypted data operation includes a memory that stores instructions, and a processor that executes the instructions to perform operations. The operations may include generating an encrypted hierarchical path identifier corresponding to a hierarchical data space for at least one plaintext data operation that preserves the hierarchy of the hierarchical data space. The at least one plaintext data operation may correspond to at least one subdivision of the hierarchical data space. The operations may further include encrypting the at least one plaintext data operation, and sending a request to perform an encrypted data operation to a server. The request may include the encrypted data operation and the encrypted hierarchical path identifier. In one embodiment, the operation of generating the encrypted hierarchical path identifier includes determining the at least one subdivision to which the at least one plaintext data operation corresponds; calculating a secret permutation for each of the at least one subdivision; and generating an encrypted label for each of the at least one subdivision using the corresponding secret permutation. In this or another embodiment, the operations may further include generating the hierarchical data space including recursively subdividing a data space that corresponds to the at least one plaintext operation into at least two levels of subdivision. In at least one embodiment, at least an initial subdivision of the data space is based on parameters generated using a secret key. In any of the above or another embodiment, the encrypted path identifier may include the encrypted label generated for the at least one subdivision. In any of the above or another embodiment, the operation of generating the encrypted hierarchical path identifier may include obscuring ordering within the hierarchical data space with respect to the encrypted hierarchical path identifier. In any of the above or another embodiment, the operations may further include generating at least one additional encrypted hierarchical path identifier corresponding to a different hierarchical data space for the at least one plaintext data operation that preserves the hierarchy of the different hierarchical data space, wherein the at least one plaintext data operation corresponds to at least one subdivision of the different hierarchical data space and sending the at least one additional encrypted hierarchical path identifier with the request to perform the encrypted data operation to the server. In any one of the above or another embodiment, the operations may further include determining at least one partition of an encrypted hierarchical data space containing the encrypted hierarchical path identifier and selecting at least one server associated with the at least one partition containing the encrypted hierarchical path identifier. In one such embodiment, the operation of sending the request to perform the encrypted data operation to the server includes sending the request to the selected at least one server.

In another aspect, a method for implementing an encrypted data operation includes generating, by utilizing instructions from a memory that are executed by a processor, an encrypted hierarchical path identifier corresponding to a hierarchical data space for at least one plaintext data operation that preserves the hierarchy of the hierarchical data space. The at least one plaintext data operation may correspond to at least one subdivision of the hierarchical data space. The method may further include encrypting the at least one plaintext data operation, and sending a request to perform an encrypted data operation to a server. The request may include the encrypted data operation and the encrypted hierarchical path identifier. In one embodiment, generating the encrypted hierarchical path identifier may include determining the at least one subdivision to which the at least one plaintext data operation corresponds; calculating a secret permutation for each of the at least one subdivision; and generating an encrypted label for each of the at least one subdivision using the corresponding secret permutation. In this or another embodiment, the method may include generating the hierarchical data space including recursively subdividing a data space that corresponds to the at least one plaintext operation into at least two levels of subdivision. In at least one embodiment, at least an initial subdivision of the data space is based on parameters generated using a secret key. In any of the above or another embodiment, the encrypted path identifier may include the encrypted label generated for the at least one subdivision. In any of the above or another embodiment, generating the encrypted hierarchical path identifier may include obscuring ordering within the hierarchical data space with respect to the encrypted hierarchical path identifier. In any of the above or another embodiment, the method may further include generating at least one additional encrypted hierarchical path identifier corresponding to a different hierarchical data space for the at least one plaintext data operation that preserves the hierarchy of the different hierarchical data space. The at least one plaintext data operation may correspond to at least one subdivision of the different hierarchical data space. The method may further include sending the at least one additional encrypted hierarchical path identifier with the request to perform the encrypted data operation to the server. In any one of the above or another embodiment, the method may further include determining at least one partition of an encrypted hierarchical data space containing the encrypted hierarchical path identifier and selecting at least one server associated with the at least one partition containing the encrypted hierarchical path identifier. In one such embodiment, sending the request to perform the encrypted data operation to the server may include sending the request to the selected at least one server.

In still another aspect, a computer readable device, which when loaded and executed by a processor, causes the processor to perform operations including generating an encrypted hierarchical path identifier corresponding to a hierarchical data space for at least one plaintext data operation that preserves the hierarchy of the hierarchical data space. The at least one plaintext data operation may correspond to at least one subdivision of the hierarchical data space. The operations may further include encrypting the at least one plaintext data operation, and sending a request to perform an encrypted data operation to a server. The request may include the encrypted data operation and the encrypted hierarchical path identifier. In one embodiment, the operation of generating the encrypted hierarchical path identifier includes determining the at least one subdivision to which the at least one plaintext data operation corresponds; calculating a secret permutation for each of the at least one subdivision; and generating an encrypted label for each of the at least one subdivision using the corresponding secret permutation. In this or another embodiment, the operations may further include generating the hierarchical data space including recursively subdividing a data space that corresponds to the at least one plaintext operation into at least two levels of subdivision. In at least one embodiment, at least an initial subdivision of the data space is based on parameters generated using a secret key. In any of the above or another embodiment, the encrypted path identifier may include the encrypted label generated for the at least one subdivision. In any of the above or another embodiment, the operation of generating the encrypted hierarchical path identifier may include obscuring ordering within the hierarchical data space with respect to the encrypted hierarchical path identifier. In any of the above or another embodiment, the operations may further include generating at least one additional encrypted hierarchical path identifier corresponding to a different hierarchical data space for the at least one plaintext data operation that preserves the hierarchy of the different hierarchical data space, wherein the at least one plaintext data operation corresponds to at least one subdivision of the different hierarchical data space and sending the at least one additional encrypted hierarchical path identifier with the request to perform the encrypted data operation to the server. In any one of the above or another embodiment, the operations may further include determining at least one partition of an encrypted hierarchical data space containing the encrypted hierarchical path identifier and selecting at least one server associated with the at least one partition containing the encrypted hierarchical path identifier. In one such embodiment, the operation of sending the request to perform the encrypted data operation to the server includes sending the request to the selected at least one server.

In yet another aspect, a system for performing an encrypted data operation includes a memory that stores instructions, and a processor that executes the instructions to perform operations including receiving an encrypted data operation and a first encrypted hierarchical path identifier from a client. The operations may further include finding at least one data index node of at least one data index using the first encrypted hierarchical path identifier, and sending the encrypted results of the encrypted data operation to the client. In one embodiment, the encrypted data operation is a mutation and the operations further include executing the encrypted data operation within the at least one data index node. In one embodiment, the encrypted data operation is a query and the operations include receiving a second different encrypted hierarchical path identifier associated with the encrypted data operation; searching for encrypted data tuples that are associated with a first encrypted hierarchical path identifier matching the first encrypted hierarchical path identifier; searching for encrypted data tuples that are associated with the second different encrypted hierarchical path identifier that matches the second different encrypted hierarchical path identifier; and sending the encrypted data tuples identified in the search to the client.

In still yet another aspect, a method for performing an encrypted data operation includes receiving an encrypted data operation and a first encrypted hierarchical path identifier from a client. The method may further include finding, by utilizing instructions from a memory that are executed by a processor, at least one data index node of at least one data index using the first encrypted hierarchical path identifier. The method may further include sending the encrypted results of the encrypted data operation to the client. In one embodiment, the encrypted data operation is a mutation and the method further includes executing the encrypted data operation within the at least one data index node. In one embodiment, the encrypted data operation is a query and the method includes receiving a second different encrypted hierarchical path identifier associated with the encrypted data operation; searching for encrypted data tuples that are associated with a first encrypted hierarchical path identifier matching the first encrypted hierarchical path identifier; searching for encrypted data tuples that are associated with the second different encrypted hierarchical path identifier that matches the second different encrypted hierarchical path identifier; and sending the encrypted data tuples identified in the search to the client.

In another aspect, a computer readable device, which when loaded and executed by a processor, causes the processor to perform operations including receiving an encrypted data operation and a first encrypted hierarchical path identifier from a client. The operations may also include finding at least one data index node of at least one data index using the first encrypted hierarchical path identifier, and sending the encrypted results of the encrypted data operation to the client. In one embodiment, the encrypted data operation is a mutation and the operations further include executing the encrypted data operation within the at least one data index node. In one embodiment, the encrypted data operation is a query and the operations include receiving a second different encrypted hierarchical path identifier associated with the encrypted data operation; searching for encrypted data tuples that are associated with a first encrypted hierarchical path identifier matching the first encrypted hierarchical path identifier; searching for encrypted data tuples that are associated with the second different encrypted hierarchical path identifier that matches the second different encrypted hierarchical path identifier; and sending the encrypted data tuples identified in the search to the client.

An advantage of the data management system is that use of the system provides a faster and more efficient way to index and search encrypted data without decrypting the data.

Another advantage of the data management system is that use of the system provides an improved way of querying encrypted data that reduces the number of candidate query results.

Still another advantage of the data management system is that use of the system provides a faster way of performing operations on encrypted data.

Yet another advantage of the data management system is that use of the system eliminates the leaking of information about encrypted data and encrypted metadata.

Still yet another advantage of the data management system is that use of the system provides a way to distribute encrypted data over many computing resources without leaking information about the encrypted data.

Another advantage of the data management system is that use of the system supports high performance encrypted data operations upon complex data relations without leaking information.

These and other embodiments are described in more detail below. It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate various embodiments of the invention that when together with the description serve to explain the various aspects, principles, and beneficial features and configurations disclosed herein.

FIG. 7 shows the creation of an encrypted hierarchical path identifier (EncHPId) that has the advantage of preserving the hierarchy of the plaintext hierarchical path according to various embodiments;

DETAILED DESCRIPTION

A secure encrypted data management system and associated method that efficiently and securely operates upon encrypted data stored within a server are disclosed and described herein with reference to FIGS. 2-11. The encrypted data may be operated on by the server without the server decrypting the data or knowing the plaintext data structure of the encrypted data stored within the server. According to various embodiments, the system may include one or more clients configured to perform encrypted data operations including storing data or querying data stored on one or more servers. In one example of a storage operation, the client may generate a plaintext hierarchical path identifier for plaintext data by recursively subdividing a plaintext data space and appending a label to the identifier based on which subdivision contains the plaintext data. The client may then encrypt the plaintext hierarchical path identifier to generate an encrypted hierarchical path identifier using an encryption method that preserves the hierarchy of the plaintext data space. The client may also encrypt the plaintext data and send both the encrypted hierarchical path identifier and the associated encrypted data to the server. The server then indexes the encrypted data based on the encrypted hierarchical path identifier. The server does not contain any information regarding the plaintext data or the real location of the plaintext data in the plaintext hierarchical data space. Instead, the server only operates to hold the encrypted data in its indexes based on a node location specified by the encrypted hierarchical path identifier. In one example of a query operation, the client may generate a hierarchical path identifier for the desired data and then encrypt the hierarchical path identifier using the same encryption method. The client may then send the encrypted hierarchical path identifier to the server and request that the server send back encrypted data matching or associated with the encrypted hierarchical path identifier. As described in more detail below and in the accompanying drawings, the server can perform the encrypted data operations without decrypting the encrypted data or encrypted hierarchical path identifier because the hierarchy of the data space is preserved by the hierarchical path identifier encryption method.

Figure 1:
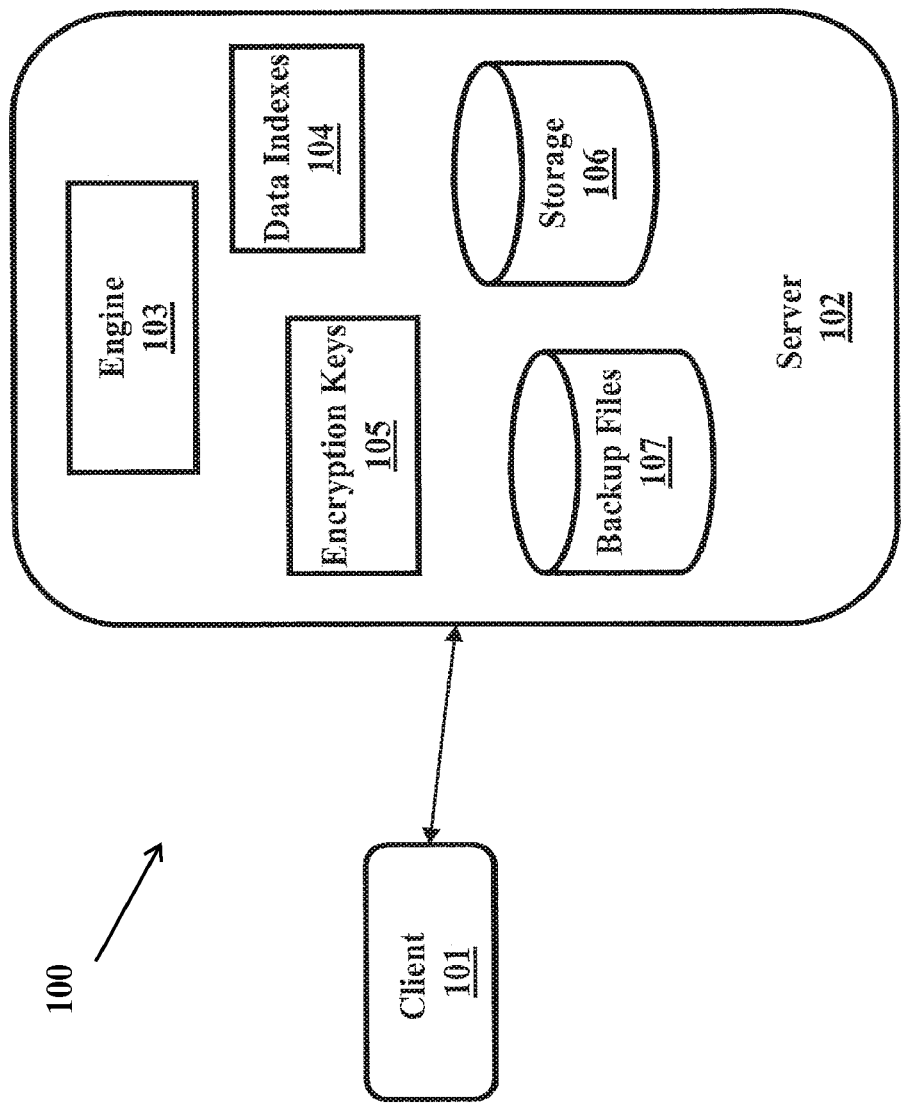
FIG. 1 shows an insecure prior art encrypted data management system.
Figure 2:
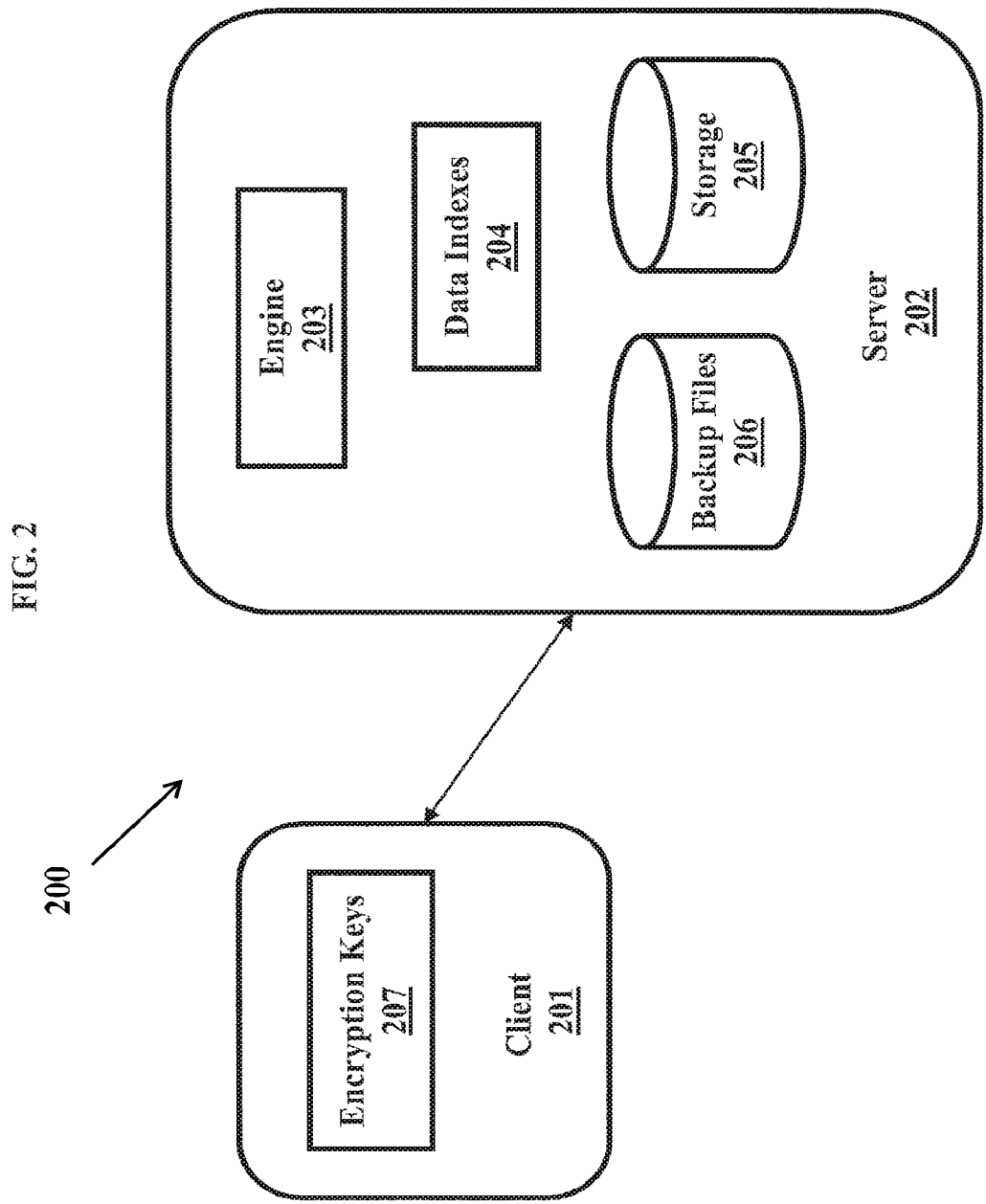
FIG. 2 shows a secure encrypted data management system and method according to various embodiments.

With particular reference to FIG. 2, a secure encrypted data management system 200 may include a client 201 and a server 202 wherein the client communicates with the server 202 in to implement performance of encrypted data operations that operate on encrypted data within the server 202. The data may be encrypted using keys 207 stored separately from the server 202, such as on client 201. The server 202 may otherwise have no access to the encryption keys 207 used to encrypt the data it is storing. The system 200 may also be configured to operate on the encrypted data fast enough for practical use and without leaking information.

Server 202 includes data management engine 203, data indexes 204, storage 205, and backup files 206. Storage 205 could be any type of storage such as directly attached disk, network storage, virtual storage, or even cloud storage. Backup files 206 can include any type of backup file and could be stored locally, on the network, or in the cloud. Server 202 includes of one or more actual physical or virtual servers running on one or more physical processor and that can be distributed over the network.

In various embodiments, the encrypted data management system 200 provides a secure and efficient method of indexing and performing encrypted data operations. Exemplary encrypted operations can be performed such as data inserts, updates, deletes, retrieval, compare and swap, query, and transactions. The encrypted data management system 200 may employ a hierarchical path identifier (HPId) that specifies a path to a subdivision of a hierarchical data space. The path may include the identity of each parent subdivision to the target subdivision. An encrypted hierarchical path identifier (EncHPId) may be employed to secretly specify this path so that only the holder of a secret key knows the actual subdivisions in the plaintext hierarchical data space represented by the path. The term plaintext is used to denote an unencrypted form. Plaintext can be any data type.

The system 200 may be configured such that server 202 and data management engine 203 may perform encrypted data operations without decrypting the encrypted data operation. For example, embodiments may associate at least one encrypted hierarchical path identifier with each encrypted data operation. The system 200 may also be configured to employ methods of encrypting hierarchical path identifiers that ensure that an attacker with access to server 202 cannot derive information about the plaintext data operation from an encrypted hierarchical path identifier associated with the encrypted data operation.

In various embodiments, implementing an encrypted data operation includes generating at least one encrypted hierarchical path identifiers on the client 201, associating the at least one encrypted hierarchical path identifiers with at least one encrypted data operation, and sending the at least one encrypted hierarchical path identifiers and the at least one encrypted data operation to server 202. In the illustrated embodiment, client 201 has access to the encryption keys 207 and server 202 has no knowledge of plaintext subdivisions represented by encrypted hierarchical path identifiers, which is kept secret by the method of encrypting the hierarchical path identifiers. For example, the encrypted hierarchical path identifiers generated do not reveal the plaintext subdivisions thereby obscuring ordering from attackers.

To perform the at least one encrypted data operation, server 202 does not need access to the encryption keys 207 for either the encrypted hierarchical path identifiers or for the encrypted data tuples that server 202 is storing and indexing. Rather, server 202 may be configured to perform encrypted data operations using at least one encrypted hierarchical path identifiers without having any knowledge of the plaintext hierarchical data space. For example, generating encrypted hierarchical path identifiers may preserve hierarchy of the plaintext hierarchical data space corresponding to a data operation. Preserving hierarchy means that for any given subdivision, its parent subdivision is its parent in both the plaintext hierarchical data space and in the encrypted hierarchical data space.

The preservation of hierarchy allows server 202 to perform operations using encrypted hierarchical path identifiers as if they were plaintext hierarchical path identifiers. While this may seem like a security weakness, the method of encrypting the hierarchical path identifiers employed by the system 200 practically ensures that an attacker cannot map a subdivision pointed to by an encrypted hierarchical path identifier to the real location of that subdivision in the plaintext hierarchical data space. For example, the child subdivisions for every subdivision may be securely scrambled using a secret permutation. Since a parent subdivision is a sibling subdivision within a secret permutation, the actual location of the parent subdivision within the plaintext hierarchical data space may also be unknown to server 202. Therefore, knowing the securely scrambled path for a given subdivision to the top of the hierarchy does not yield information about the location of the data in the plaintext hierarchical data space.

In various embodiments, each hierarchical data space may be defined using a secret key to mitigate any possible statistical attacks. As noted above, server 202 may not have knowledge or access to such encryption keys 207. For instance, an attacker might try to determine the likely distribution of data across a hierarchical data space and then try to match that with the distribution of data within server 202. An attacker would then try to determine the secret permutations at each level of the hierarchy. However, this would require knowledge of the initial subdivision of the hierarchical data space. Encrypting hierarchical path identifiers makes such statistical attacks intractable for all but the first few levels of the hierarchy. Even if an attacker guessed correctly the permutation of the first few levels of the hierarchy, attacking the cryptography used to generate the permutations is currently considered intractable. However, in various embodiments, an initial subdivision of the data space may be defined based on parameters generated using a secret key thereby rendering this type of attack even more difficult for the first few levels of the hierarchy.

Embodiments of the system 200 may support many types of encrypted operations. Two exemplary types of operations include mutations and queries, which may be generally synonymous with filtering. For example, the system 200 may implement a mutation operation that includes generating at least one hierarchical path identifiers for a corresponding plaintext data tuple (a set of values), generating at least one encrypted hierarchical path identifiers corresponding to the plaintext data tuple by encrypting the at least one hierarchical path identifiers, and sending the encrypted path identifiers with the data tuple in an encrypted form from the client 201 to the server 202. The server 202 may then store and index the encrypted data tuple based on the associated encrypted hierarchical path identifiers. It is able to do this efficiently because the encrypted hierarchical path identifier points to the specific location in the index 204 to perform the encrypted data operation. The encrypted hierarchical path identifier does not point to the plaintext subdivision in the hierarchical data space because it is based on secret permutations at each subdivision. Therefore, the index 204 cannot be mapped to the plaintext hierarchical data space without the secret key used to generate the secret permutation. The client 201 may be the only participant having access to the mapping of the plaintext hierarchical data space to the encrypted hierarchical data space. Server 202 can perform the encrypted data operation in index 204 without any knowledge of the plaintext data or plaintext hierarchical path identifier. For example, server 202 may be configured to perform the encrypted data operation in whatever location or locations pointed to by the encrypted hierarchical path identifier.

In various embodiments, the functions that create hierarchical path identifiers may map directly to data structure of index 204. For example, in at least one embodiment, index 204 may include one or more sparse trees with eight second level subdivisions recursively divided into four subdivisions until a maximum depth is reached. Other combinations of subdivisions may also be used. In such an embodiment, the functions that create the hierarchical path identifiers map directly to this tree structure. Some embodiments, may include other indexing methods such as a BTree, RTree, SkipList, HashMap, column-oriented, or other data structures may also be used. However, these other indexing methods may not directly map the encrypted hierarchical path identifiers to their internal data structures, which may result in reduction in efficiency.

In an example of a data operation including a query operation, hierarchical path identifiers may point to a portion of the index 204 that the query needs to search to perform the query. In at least one embodiment, an encrypted data operation including a query operation includes generating at least one hierarchical path identifiers for the plaintext query, generating at least one encrypted hierarchical path identifiers corresponding to the plaintext query by encrypting the at least one hierarchical path identifiers, and sending the encrypted path identifiers with the query in an encrypted form from the client 201 to the server 202. Server 202 may then find the candidate encrypted data tuples by searching its indexes 204 for matching encrypted hierarchical path identifiers. In this embodiment, server 202 need not decrypt the encrypted data tuples in order to evaluate them. Server 202 also does not need to decrypt the query. Rather, server 202 may use the encrypted hierarchical path identifiers to determine the set of possible results for the query. Server 202 may return a list of matching encrypted data tuples to client 201. In at least one embodiment, instead or in addition to the list, server 202 may send back a set of encrypted data tuples that contains the complete set of results for the query. In some instances, server 202 may send back candidate results that do not match the plaintext query. Client 201 may decrypt the encrypted data tuples received from server 202 using encryption keys 207. Client 201 may then evaluate the plaintext data tuples using the plaintext query to determine if the correct results to the encrypted data operation have been received. The method of encrypting the encrypted hierarchical path identifiers may have the advantage that the server 202 has no knowledge of either the plaintext data, plaintext query, or the actual location of the plaintext data or plaintext query within the plaintext data space, which may also include memory within server 202, storage 205, backup files 206, and any other component that may be part of a data management server 202.

As introduced above, data operations may be encrypted so that they do not leak information to any attacker that may be listening. Although secure transport such as secure socket layer (SSL), transport layer security (TLS), Hypertext Transfer Protocol Secure (HTTPS) or other secure transport may be used for communications between client 201 and server 202, an attacker may have control of server 202 and be able to see the messages being passed between client 201 and server 202. Therefore data operations may be encrypted so that server 202 has no knowledge or access of any plaintext information that could be used by an attacker.

The method of generating encrypted hierarchical path identifiers may be employed to greatly increase efficiency of the operations within server 202 and reduce the amount of computation required within client 201. In at least one embodiment, encrypted hierarchical path identifiers may preserve hierarchy while not leaking information about the data's location within its plaintext hierarchical data space. That is, while hierarchy is preserved in an encrypted hierarchical path identifier, the ordering within the corresponding hierarchical data space is hidden from the server 202. Thus, in at least one embodiment, generating the encrypted hierarchical path identifier obscures ordering within the hierarchical data space with respect to the encrypted hierarchical path identifier. In contrast, schemes where the ordering of plaintext data is not kept secret, information about the plaintext data may leak.

A hierarchical data space is a recursively divided data space containing at least two levels of subdivision. For example, in at least one embodiment, a hierarchical data space may include 15 to 20 levels of subdivision. A hierarchical path identifier may be generated that directly specifies a path to and the location of a node in a hierarchical tree structure.

A hierarchical path identifier specifies a path through a hierarchical data space and therefore a specific subspace or subdivision of the data space. A hierarchical path identifier can specify a path to a subdivision at any depth. A hierarchical path identifier does not identify what is typically known as a bucket in a hashing method as hash buckets are not hierarchical. A hierarchical path identifier also does not identify a bucket within a flattened set of buckets that have been distributed over some target distribution. A hierarchical data space is not a taxonomy and does not identify a concept within a taxonomy or hierarchy of concepts. In at least one embodiment, a data space includes a Euclidean space and data types are mapped to the Euclidean space in different ways depending on the data type.

Figure 3:
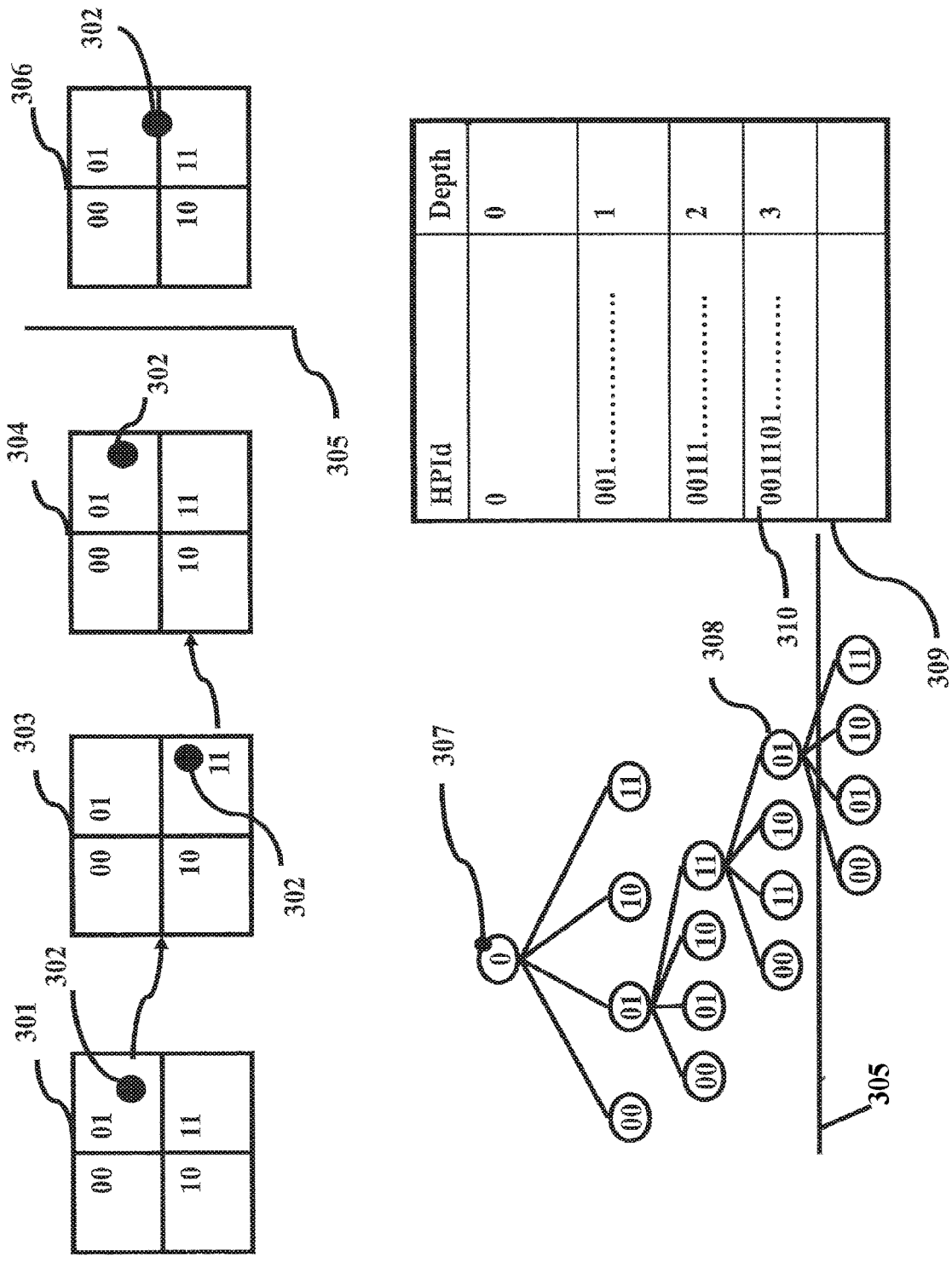
FIG. 3 shows a method of subdividing a data space and creating a hierarchical path identifier (HPId) according to various embodiments.

FIG. 3 shows a method of subdividing a data space and creating a plaintext hierarchical path identifier (HPId) that identifies the location of a data value within a hierarchical data space. In various embodiments, the method may be used with hierarchical data spaces that include one or more dimensions. In the illustrated embodiment, the hierarchical data space has two dimensions. The initial data space 301 is subdivided into four quadrants. Since data value 302 is located in subdivision labeled {01} of data space 301, the label {01} is appended to the initial data space's HPId {0} depth 0, resulting in HPId {001} with depth 1. Depth indicates the number of steps from the root of the data space that the hierarchical path identifier includes. Depth can also be viewed as the number of subdivisions from the root of the data space. For instance, in the illustrated embodiment, depth 1 indicates that the hierarchical path identifier includes one step from the root or the first subdivision. Depth 10 would indicate that the hierarchical path identifier represents a path with 10 steps or 10 subdivisions from the root. In other embodiments different labeling schemes can be used. Each step may also have a label. Since data value 302 is located in subdivision {01} of initial data space 301, subdivision {01} of data space 301 is chosen to be subdivided, resulting in subdivision 303. Since data value 302 is located in subdivision labeled {11} of subdivision 303, {11} is appended to the hierarchical path identifier, resulting in path {00111} with depth 2. The recursive process may continue until the depth reaches the maximum depth or the data value is no longer contained in a single subdivision as shown in subdivision 306. Data values with size and shape such as a polygon may not reach the maximum depth while point values would always reach a maximum depth. Data value 302 crosses a boundary of the subdivision 306. Termination 305 shows where the process terminates because data value 302 is no longer contained within a single subdivision. Since the process terminates at depth 3, the resulting HPId 310 is {0011101} depth 3. The hierarchical path identifier specifies each subdivision {01}, {11}, {01} from the root {0}. The location of data value 302 can be found by starting at the root and using the next subdivision label to determine which subdivision to step to along the path.

Since the hierarchical path identifier may terminate before maximum depth is reached, there can be many subdivisions with greater depth beneath this hierarchical path identifier. Thus, in at least one embodiment, hierarchical path identifier 310 may be used to indicate an interest in the subdivision plus all of its child subdivisions and all of its parents all the way to the root.

Tree structure 307 corresponds to the subdivision in 301, 303, and 304. The calculated HPId 310 {0011101} depth 3 describes the path to node 308 in the tree. Since hierarchical path identifier 310 can also be used to indicate interest in node 308 and all its children, client 201 can make use of this in its encrypted operations with server 202. This property may be particularly useful for performing certain types of queries such as range, bounding, and intersection queries. For instance, a query can go to the subdivision 304 {01} specified by the hierarchical path identifier and then evaluate all of the data tuples in that subdivision and search all child subdivisions. The hierarchical nature of this method may be employed to provide that all values contained by 304 {01} are contained in its child subdivisions.

In at least one embodiment, hierarchical path identifiers are encoded using binary values. In other embodiments, the hierarchical path identifiers can use a variety of encodings such as strings. In some embodiments, the depth is binary encoded as bits within the same 32-bit or 64-bit value as the hierarchical path identifier. In other embodiments, the depth can be implicitly included by using a variable length encoding of the hierarchical path identifier. In another embodiment, the depth may be a separate value associated with the hierarchical path identifier. In another embodiment, the depth could be explicitly included using some other encoding such as a string encoding.

In various embodiments, for any data value, the path to a node in a data index tree can be calculated independently from the tree data structure itself. For instance, with reference to FIG. 2, the path to a node in a data index 204 on server 202 can be computed on client 201. In contrast, commonly used data index trees, Btrees, and Rtrees do not have this property as operations on these data indexing structures rely on traversing the tree and comparing keys at each node to determine which path or paths to follow. Such operations performed on these common indexing structures lack security and efficiency because keys within the Rtrees and Btrees need to be plaintext, or they need to be encrypted and decrypted as they are used within the tree.

In at least one embodiment, a data tuple can be stored in the tree structure 307 by knowing the hierarchical path identifier associated with the data tuple without knowing anything about the value of the data tuple itself. Knowledge of the data tuple itself is unnecessary since the hierarchical path identifier specifies the exact tree node that contains the data tuple. In various embodiments, hierarchical path identifiers can be computed on the processor of one computer independently from the underlying data index structure and associated with the data tuple. The data tuple can then be encrypted and sent along with the hierarchical path identifier to a second computer, which can index and store the data tuple without any knowledge of the data tuple. The second computer simply navigates a data index tree such as 307 based on the path specified in the hierarchical path identifier. When it reaches its destination node, it can store the data tuple there. An advantage of using hierarchical path identifiers encoded using simple binary values is that traversing the data structure requires simple bit comparisons. Plaintext hierarchical path identifiers leak information about the location of the data tuple in a data space. In other words, the range of values for a data tuple can be determined based on the association of a data tuple to a subdivision.

A data tuple can contain one or more elements. In various embodiments, the entire data tuple can be encrypted or each element of the data tuple can be encrypted. For example, in some embodiments, each element can be encrypted using different secret keys. Some elements can be left as plaintext while others can be encrypted. Any encryption algorithm can be used to encrypt the tuples, such as symmetric encryption algorithms, Advanced Encryption Standard, Blowfish, Twofish, Threefish, Data Encryption Standard (DES), IDEA, RC4, or Tiny Encryption Algorithm Asymmetric encryption may also be used such as DSA, ELGamal, Elliptic curve cryptography, or RSA.

Figure 4:
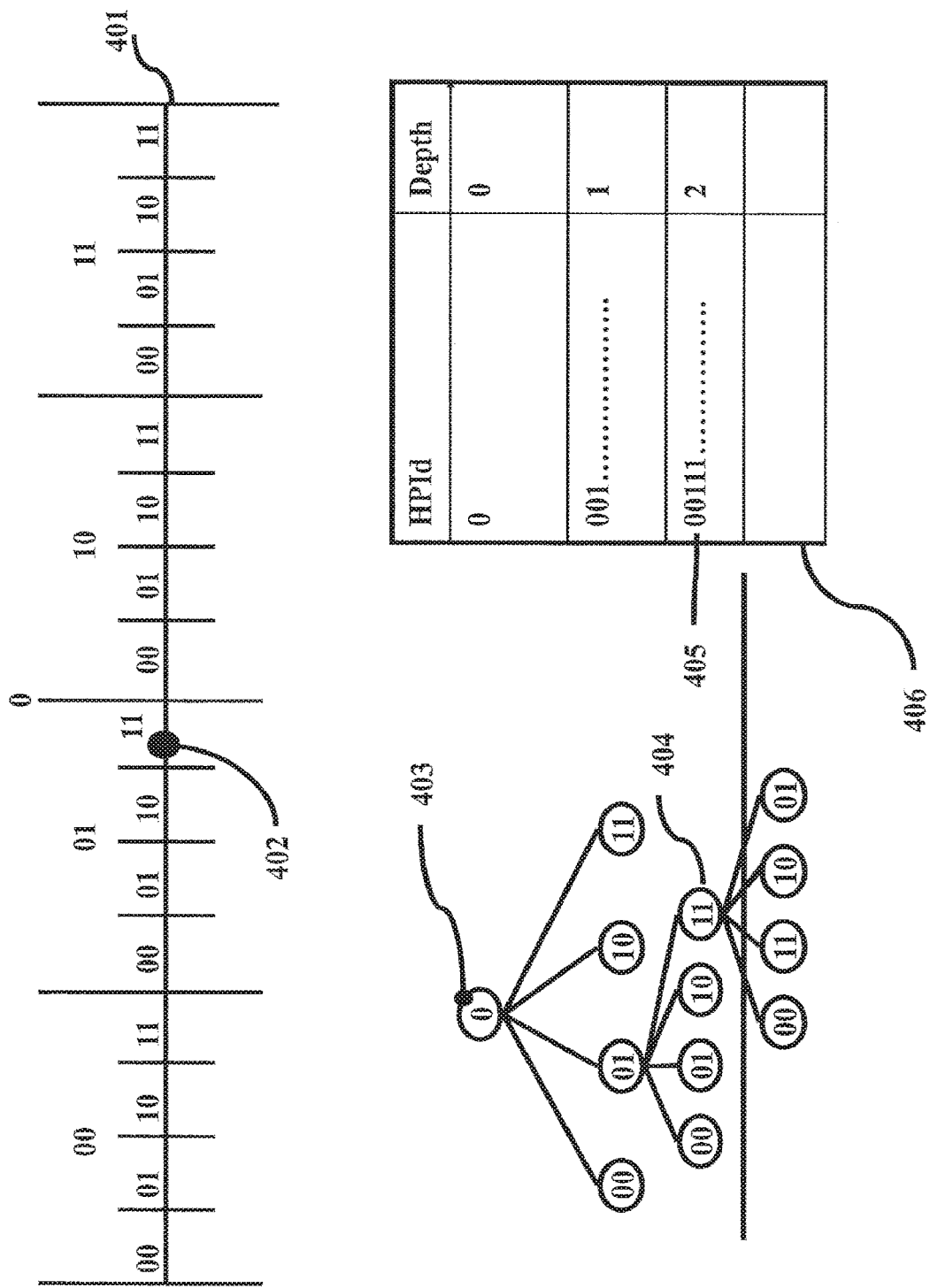
FIG. 4 shows a method of generating a hierarchical path identifier for different types of data values according to various embodiments.

FIG. 4 shows a method of generating a hierarchical path identifier that can be performed for different types of data values such as numbers, temporal values, or anything that can be mapped to a line. In this embodiment, the initial root of the data space is labeled {0} with depth 0. It is subdivided into four quadrants as shown in 401. These quadrants of the first subdivision have the labels {00, 01, 10, 11}. Since data value 402 is located in the first subdivision labeled {01}, {01} is appended to the hierarchical path identifier, resulting in HPId {001} with depth 1. Since data value 402 is located in subdivision {01}, subdivision {01} is chosen to be subdivided. Since data value 402 is located in the second subdivision labeled {11}, {11} is appended to the hierarchical path identifier, resulting in path 405 labeled {00111} with depth 2. Table 406 shows the hierarchical path identifiers at each step or depth level. The recursive process may continue until the depth equals the maximum depth or the data value is no longer contained in a single subdivision. Tree structure 403 corresponds to the subdivided data space 401. The calculated HPId {00111} depth 2 describes the path to node 404 in the tree. In various embodiments, spatial, temporal, numeric values, alphanumeric, lexigraphic, multidimensional, combined data type values, or other data types can be mapped to a hierarchical data space and represented by a hierarchical path identifier. In some embodiments, hierarchical path identifiers can also be calculated for points, intervals, circles, polygons, and other shapes.

An important advantage of using hierarchical path identifiers is that multiple, different subdivisions of a data space can be used to enhance search speed.

Figure 5:
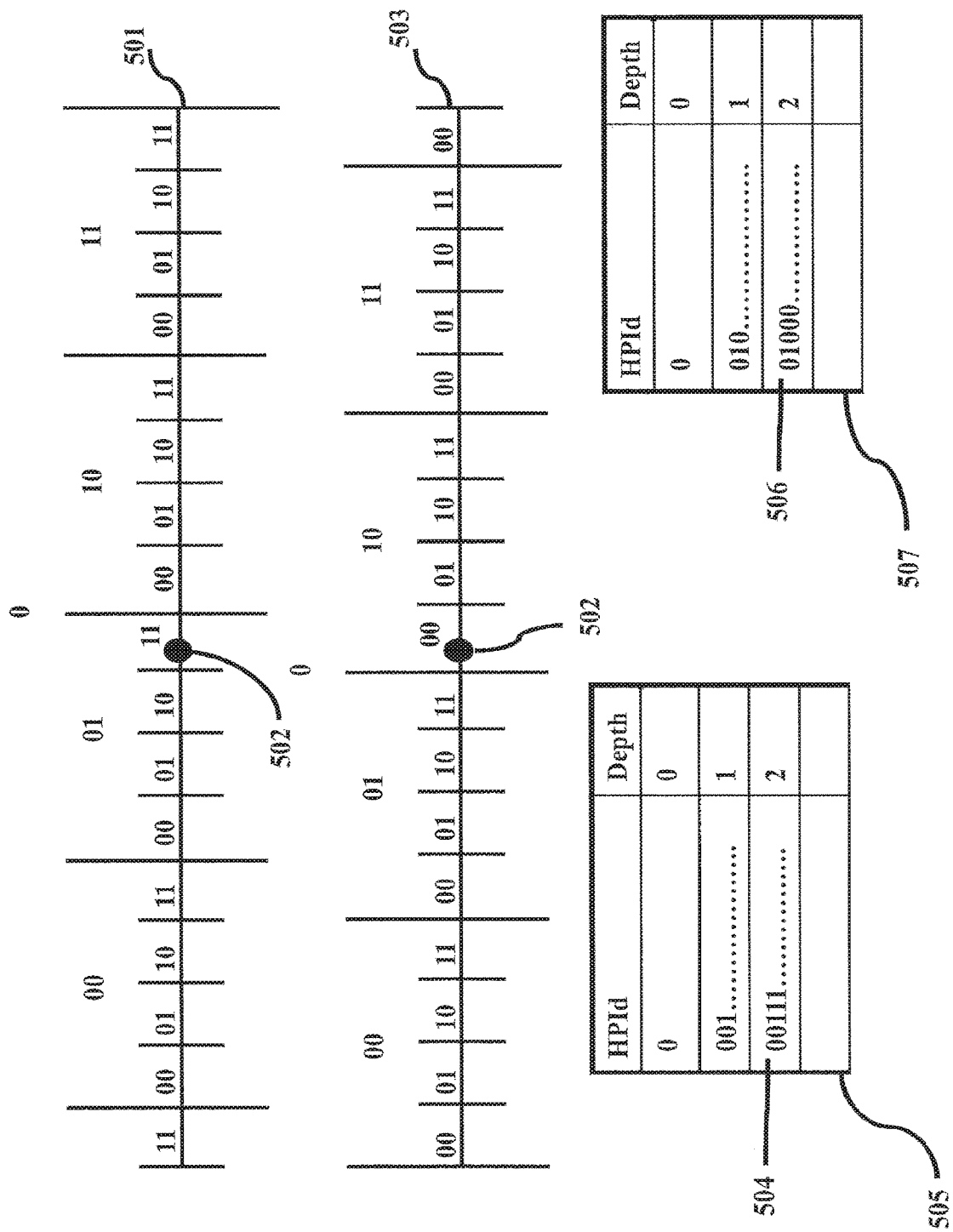
FIG. 5 shows that using different partitioning schemes generate a different hierarchical path identifier according to various embodiments.

FIG. 5 shows that shifting the subdivision for a hierarchical partitioning scheme may be used to generate a different hierarchical path identifier. Different hierarchical path identifiers refer to hierarchical path identifiers representing different data space partitioning. In the hierarchical data space 501, data value 502 is located in {0}, {01}, and {11}. This results in a HPId 504 {0011} depth 2. Table 505 shows the hierarchical path identifier for data value 502 at each step in the hierarchical data space 501. In the hierarchical data space 503, the same data value 502 has a different hierarchical path identifier because the space has been subdivided differently. Data value 502 has a hierarchical path identifier 506 {01000} depth 2. Table 507 shows the HPId at each step for data value 502 in hierarchical data space 503. An advantage of using multiple different hierarchical path identifiers is that the combination of two or more different hierarchical path identifiers is often more "selective" than a single hierarchical path identifier. In the illustrated embodiment, hierarchical data space 501 and hierarchical data space 503 are different frames of reference within which to evaluate data values when performing a search.

Using multiple frames of reference can dramatically reduce the number of data values that have to be fully evaluated for a query. For instance, a data value in one frame of reference may cross a boundary at a high level in the space partitioning, resulting in a shallow hierarchical path identifier. Many types of searches of the tree that transit that shallow path have to evaluate the tuple stored in that node and all of the tuples in all of the child nodes below it. For these types of searches, the result would be many expensive computations and disk accesses. However, in a different frame of reference, the hierarchical path identifier for the data value might be deeper in that hierarchy. By associating multiple different hierarchical path identifiers with a data tuple, the search can check that all of the tuple's associated hierarchical path identifiers are valid for the hierarchical path identifiers associated with the search. By using multiple frames of reference, the probability that a small shape or interval will cross a high level boundary in all the frames of reference is very low. Therefore, checking that a data tuple is valid in each frame of reference dramatically reduces the computation required to perform queries.

In at least one embodiment, more than one hierarchical path identifier, each associated with a different partitioning of a data space, are associated with each data tuple and data query. This allows client 201 to construct queries associated with multiple hierarchical path identifiers that can be sent to server 202. Server 202 can then efficiently find a set of candidate data tuples to send back to client 201 by matching the hierarchical path identifiers associated with the query to the hierarchical path identifiers associated with each data tuple. This means that the server 202 does not have to evaluate the actual value of the data tuples but can still determine a small set of candidate data tuples to send back to client 201. This method dramatically reduces the number candidates sent back to the client 201. A data tuple that matches the hierarchical path identifier in each frame of reference has a high probability to be a match to the query and server 202 can make that determination without evaluating the plaintext data tuple.

Figure 6:
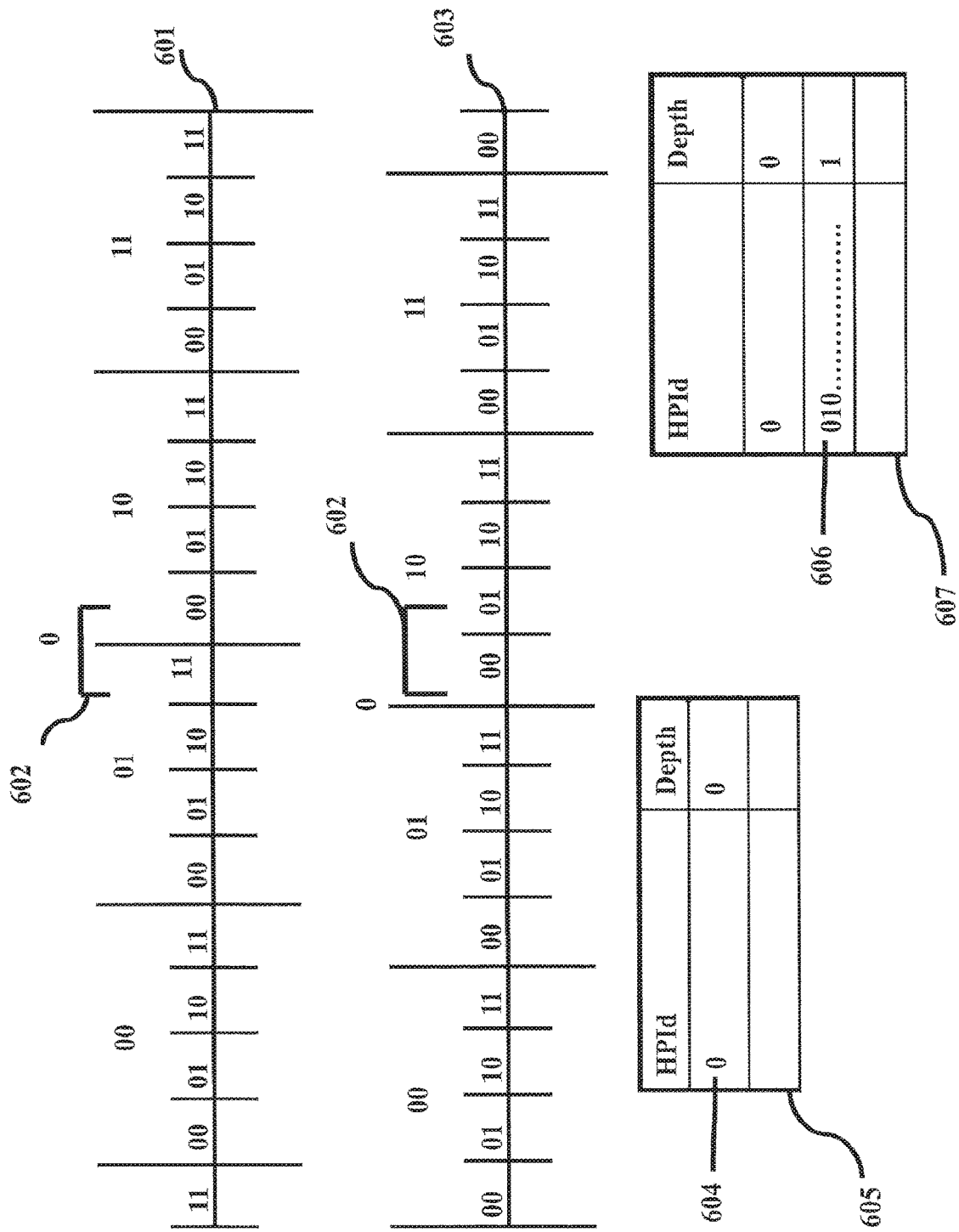
FIG. 6 shows a method of generating different hierarchical path identifiers for a range query using different hierarchical data spaces according to various embodiments.

FIG. 6 shows a method of generating hierarchical path identifiers for a range query using different hierarchical data spaces. A range query looks for all tuples between two values, inclusive or exclusive of the start and end values. Table 605 shows each step of computing the hierarchical path identifier for range query 602 in hierarchical data space 601. The query crosses a primary division of hierarchical data space 601. This means that the resulting range query hierarchical path identifier 604 for that data space is not very deep. In fact it never passes depth 0. This means that the resulting search will have to evaluate every data tuple held in the data index to see if they match the query. This is not a very selective query and may be very expensive in terms of computation, memory access, and storage access. In this embodiment, a different hierarchical path identifier is also computed for range query 602 as it relates to hierarchical data space 603. Table 607 shows each step of computing the hierarchical path identifier. Notice that the resulting HPId 606 {010} with depth {01} is deeper and, hence, more selective since only the portion of the data index covered by {010} has to be searched.

According to various embodiments, by associating multiple hierarchical path identifiers with each tuple, all of the tuple's associated hierarchical path identifiers can be checked to ensure they match the hierarchical path identifiers associated with the query before the data tuple itself is evaluated. This may dramatically reduce the number of tuples that have to be fully evaluated for a given search. These checks may also be simple bit operations that may be performed very quickly on modern computer hardware. In at least one embodiment, data indexes can also optimize the placement of tuples based on multiple hierarchical path identifiers, further increasing the efficiency of searches by reducing the tuples that have to be evaluated, which may result in significant efficiency advantages when performing spatial, temporal, range, and even key/value queries.

As introduced above, a disadvantage of hierarchical path identifiers is that they may leak information. In other words, analysis of the data space subdivisions associated with a hierarchical path identifier can be used to determine the general value of a tuple's index key. This may provide attackers with valuable information about the data tuple. It is not really more secure than a Btree holding plaintext keys, and simply encrypting a hierarchical path identifier will cause it to lose the hierarchical properties that make it so useful. However, encrypting a hierarchical path identifier according to the methods disclosed herein for efficient and secure encrypted data management may be used to overcome this limitation so that the encrypted hierarchical path identifier does not lose its hierarchical properties and keeps the underlying subdivision of data space a secret.

With continued reference to FIG. 2, the client 201 may generate a first plaintext hierarchical path identifier corresponding to a first hierarchical data space for at least one data operation. In at least one embodiment, client 201 generates the plaintext hierarchical path identifier for at least one data operation by recursively subdividing the data space and appending a label to the identifier based on which subdivision contains the data operation. FIG. 3, FIG. 4, FIG. 5, and FIG. 6 show exemplary methods of generating plaintext hierarchical path identifiers. Other exemplary methods that produce hierarchical path identifiers from a subdivided data space such as hierarchical triangular mesh, quad tree, oct-tree, or even an irregular subdivision of data space may be used where the method represents a hierarchical subdivision of space.

Once client 201 has generated a first plaintext hierarchical path identifier, client 201 may generate at least one encrypted hierarchical path identifier. Generating at least one encrypted hierarchical path identifier may include encrypting plaintext hierarchical path identifiers corresponding to a data operation into the at least one encrypted hierarchical path identifier. In various embodiments, client 201 can either encrypt each subdivision label as part of the process of generating a hierarchical path identifier, or encrypt a plaintext hierarchical path identifier after it has been generated.

In at least one embodiment, the encryption method used to encrypt one or more plaintext hierarchical path identifiers must preserve the hierarchy of the corresponding data space. Client 201 may also encrypt the plaintext data operation. After encrypting the plaintext hierarchical path identifier, the client 201 may send a request to perform the encrypted data operation to server 202. The request may include the encrypted data operation and the at least one encrypted hierarchical path identifier. The plaintext hierarchical path identifier and the plaintext data operation are kept secret and not sent to the server 202.

Server 202 receives the encrypted data operation and the encrypted hierarchical path identifiers. If the data operation is a mutation, such as a data insert, update, or transaction, server 202 indexes the encrypted data tuples based on the encrypted hierarchical path identifiers. Server 202 knows nothing about the plaintext data tuples or the real location of the data tuple in the subdivided data space. The server 202 only knows that it is to hold the encrypted data tuple in its indexes 204 based on the node location specified by the encrypted hierarchical path identifier. In at least one embodiment, when the client 201 implements performance of a query data operation, it generates at least one hierarchical path identifier for the desired query. Client 201 encrypts the at least one hierarchical path identifier and query. Client 201 then sends the at least one encrypted identifier and the encrypted query to the server 202, requesting the server 202 send back any encrypted data tuples that match or are associated with the encrypted hierarchical path identifiers. Whether the encrypted hierarchical path identifiers for the encrypted data tuple match the encrypted hierarchical path identifiers for the query depends on the type of query. In an exact match query, the encrypted hierarchical path identifiers have to be exactly the same. For a bounding query, intersection query, or range query, the encrypted hierarchical path identifiers for the data tuple must either be the same, be children, or be parents of the encrypted hierarchical path identifier. Server 202 can perform these types of exemplary queries because the hierarchy of the data space is preserved by the hierarchical path identifier encryption method. This method has the advantage that server 202 does not need to evaluate the plaintext data tuple to answer queries.

FIG. 7 shows the creation of an encrypted hierarchical path identifier according to various embodiments. In at least one embodiment, each level or step of the plaintext identifier is encrypted using encryption function (EF) 702. The encryption function takes as parameters a secret key (SKey), the parent hierarchical path identifier ($HPId_{Depth-1}$), and the portion of the plaintext hierarchical path identifier that points to that level's subdivision $HPId_{Depth}$. In at least one embodiment, the encryption function 702 is applied to each step or depth of the hierarchical path identifier. There is a secret permutation for each subdivision of the hierarchy. For instance, one step of the encryption process 701 is to encrypt hierarchical path identifier 704 using encryption function (EF) 702 with a secret key (SKey), $HPId_{Depth-1}$ {0}, and HPId$_{Depth}$ {011} as parameters resulting in an encrypted identifier 706 {0101}. Encryption function (EF) 705 shows the parameters of the encryption function at depth 1. These parameters include the secret key, HPId$_{Depth-1}$ {0}, and HPId$_{Depth}$ {(011}. HPId 703 {0} is a parameter because it is the parent of {011}. The secret permutation is computed using a secret key and {0}.

In another embodiment, the encryption function (EF) 702 does not include the parameter HPId$_{Depth-1}$. For example, the encryption function (EF) 702 may include just the secret key (SKey) and the HPId$_{Depth}$ for the subdivision at that level. In this configuration, security may be less than optimal because the encrypted permutation for every subdivision in the data space would be exactly the same. For example, the number of independent permutations for a space with four subdivisions at each level would be four. In other words, without using the parent identifier as a parameter to the encryption function, every set of child subdivisions would be reordered in exactly the same way. Accordingly, in at least one embodiment, a different permutation for every subdivision of a data space may be used. For example, for a space with four subdivisions at each level with depth 15, the number of independent permutations would be 4^15 if every subdivision had its own secret permutation dependent on a secret key and the path to the subdivision HPId$_{Depth-1}$.

An advantage of the disclosed method of generating unique, secret permutations for each subdivided space is that an attacker cannot feasibly determine which plaintext portion of a data space an encrypted hierarchical identifier points to. For instance, encrypting the plaintext hierarchical structure as represented by the encrypted hierarchical path identifiers, as described herein, may be used to completely scramble the data space. Therefore, the ordering represented by a properly encrypted hierarchical path identifier is completely secret to the server 202. Only the possessor of the secret keys 207 knows the mapping of the plaintext hierarchy to the encrypted hierarchy. The encrypted hierarchy identifier does not leak information about the ordering of the subdivisions.

As introduced above, hierarchy is preserved during the encryption of a plaintext hierarchical path identifier. Hierarchy preservation means a subdivision has the same parent subdivision in both the plaintext hierarchy and encrypted hierarchy. Hierarchy preservation allows queries such as range, intersection, and bounding queries to still function efficiently when applied to encrypted hierarchy. Hierarchy preservation also means that child nodes of a subdivision can be traversed regardless of how they have been rearranged using the secret permutation. Server 202 does not have to know the secret permutation in order to perform these queries because the encrypted hierarchy identifiers point directly to the correct nodes in data indexes 204 to query. Because hierarchy is preserved, server 202 can also traverse the children and parents of the encrypted hierarchy identifier to perform the query.

Encrypting an entire hierarchical path identifier at once would result in a random set of bits pointing to a random subdivision, much like a hash function, and would no longer be a hierarchical path identifier. Although the result of encrypting the entire identifier could allow for discrete key/value lookup, it would not support spatial, temporal, or range queries. Although it is possible to perform spatial, temporal, or range queries using a flat identifier that preserves order, the use of a flat identifier would leak ordering information about the plaintext. For example, a flat identifier could only be encrypted using one single secret permutation which could easily be solved using a statistical attack. An example of a flat identifier is an identifier that maps a data value to a range or bucket of values. Knowing the bucket that a data tuple is mapped to allows an attacker to know the range of values that contains the plaintext tuple. According to various embodiments, a properly encrypted hierarchical path identifier does not leak ordering information about the plaintext.

Figure 8:
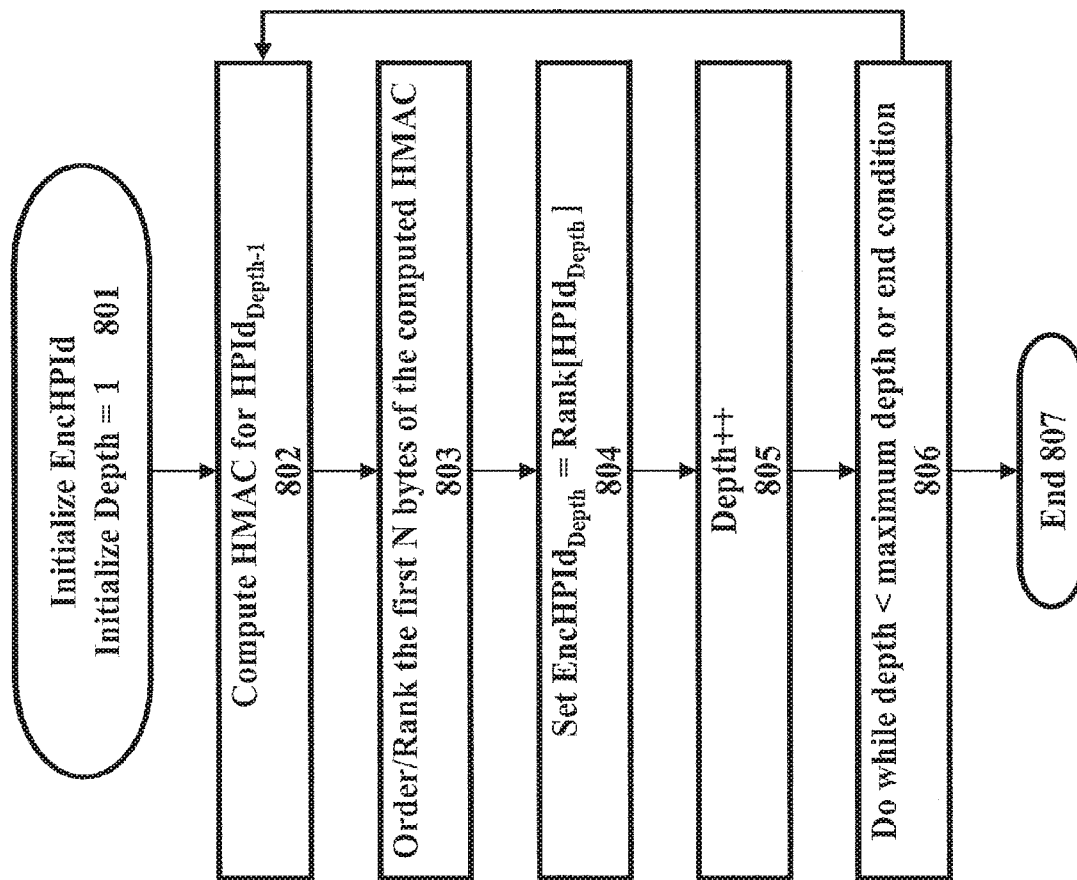
FIG. 8 shows a method for computing a secret permutation for a hierarchical data space and using it to encrypt a hierarchical path identifier according to various embodiments.

FIG. 8 shows an embodiment for computing a permutation EF (SKey, HPId$_{Depth-1}$, HPId$_{Depth}$). A hierarchical path identifier is made up of a set of labels that identify the path through a subdivided hierarchy. Other exemplary embodiments that provide a secure method of rearranging, transposing, or reordering of the subdivisions in a consistent way may also be used. Each subdivision is given a label, {00}, {01}, {10}, and {11}. In at least one embodiment, the subdivision labels are binary values for 0, 1, 2, and 3. A permutation can be thought of as a reordering or transposition of these labels. Another way to think of a permutation is as a mapping of the plaintext label to an encrypted label. In one embodiment, the method includes generating a secret permutation of the subdivisions so that there is a one to one mapping of the input subdivision to an output subdivision. For example, if there are four subdivisions with four corresponding labels for a given space, then there are four output labels. In other embodiments, the labels of a subdivision may be mapped to a different number of encrypted labels. In the illustrated embodiment, the first step 801 initializes the method by setting depth equal to 1 and initializing the output variable. The second step 802 computes a secret keyed-hash value for HPId$_{Depth-1}$ using a secret key. HPId$_{Depth-1}$ is the hierarchical path identifier of the parent of the identifier being encrypted. As shown, a keyed-hash value that depends on a secret key is used. Since the HPId$_{Depth-1}$ is not a secret and can be known by an attacker, security favors a cryptographic function that utilizes a secret key. While other methods of generating the secret keyed-hash value using a secret key may be used, a SHA-256 keyed-hash message authentication code (HMAC) using a randomly generated secret key of at least 24 bytes is used in the illustrated embodiment. Other key sizes can be used with varying levels of security. In step 803, the first N bytes of the computed HMAC are order where N is the number of subdivisions. For instance, if a space is subdivided into four subdivisions, then N is four. The N bytes can be ordered smallest to largest or largest to smallest. In various embodiments, any consistent ordering method or method of generating a permutation can be used. This ordering produces a map or permutation that can be used to map the HPId$_{Depth}$ to an encrypted hierarchical path identifier (EncHPId$_{Depth}$) as shown in step 804. At step 805, the depth is incremented. At step 806, steps 802-805 are repeated as long as the depth is less than the maximum depth or as long as the depth is less than the depth of HPId. Upon termination step 807, the result is an encrypted hierarchical path identifier (EncHPId) that does not provide any information about the data space and its subdivisions. Because the subdivisions for each level of the identifier have been rearranged using a secure method, the scrambling prevents an attacker from determining the location within a data space from the encrypted hierarchical path identifier.

According to various embodiments, generating the HMAC for the HPId$_{Depth-1}$ provides each subdivision its own unique label permutation. If each subdivision utilized the same ordering of labels, it could be easy for an attacker to try each ordering on many subdivisions and determine the mapping. However, if each subdivision has its own ordering based on the secret keyed-hash value for that subdivision, then it would be intractable for an attacker to brute-force calculate the secret permutation. Brute forcing an SHA-256 HMAC using a 24 byte secret key composed of mixed alpha numeric characters at a rate of 2 6 million keys per second is estimated to take 129 octillion years. Brute force attacking the secret permutations is even more difficult because only the ranking of the computed HMAC is exposed. Many secret keys will generate the same secret permutation for any given subdivision, so finding the secret key that generates the secret permutations for all 4^5 subdivisions is intractable. It would take at least 129 octillion years multiplied by 4^15 subdivisions.

FIG. 5 and FIG. 6 show a method for associating multiple hierarchical path identifiers, each with a different space partitioning or frame of reference, with a data tuple and indexing the data tuple based on those multiple, different hierarchical path identifiers. For example, FIG. 6 shows a method of querying based on associating multiple hierarchical path identifiers, each with a different space partitioning or frame of reference, with a query. These methods used within a data management system may provide the advantage of dramatically increasing search selectivity and efficiency. However, they may leak information.

According to various embodiments, using encrypted hierarchical path identifiers, such as multiple encrypted hierarchical path identifiers, each with a different space partitioning, may be used to provide significant advantages. For example, encrypted hierarchical path identifiers do not leak information about the underlying data space. The server 202 is also not required to decrypt and evaluate the plaintext data tuples as part of a query process because the use of multiple encrypted hierarchical path identifiers with different space partitioning may be used to increase selectivity and minimize the number of encrypted data tuples that are sent back to the client 201 in response to a query. This provides very good performance and eliminates the need to have encryption keys present on server 202. Another advantage of the method is that it may support many types of queries, such as range, bounding, and intersection queries without the server 202 needing to decrypt the encrypted data tuples.

As introduced above, in at least one embodiment, the encrypted data management system 200 operates without encryption keys ever being present on the data management server 202. The disclosed method and system 200 may operate efficiently upon the encrypted data stored within the data management server 202, and do so securely, without leaking information.

Figure 9:
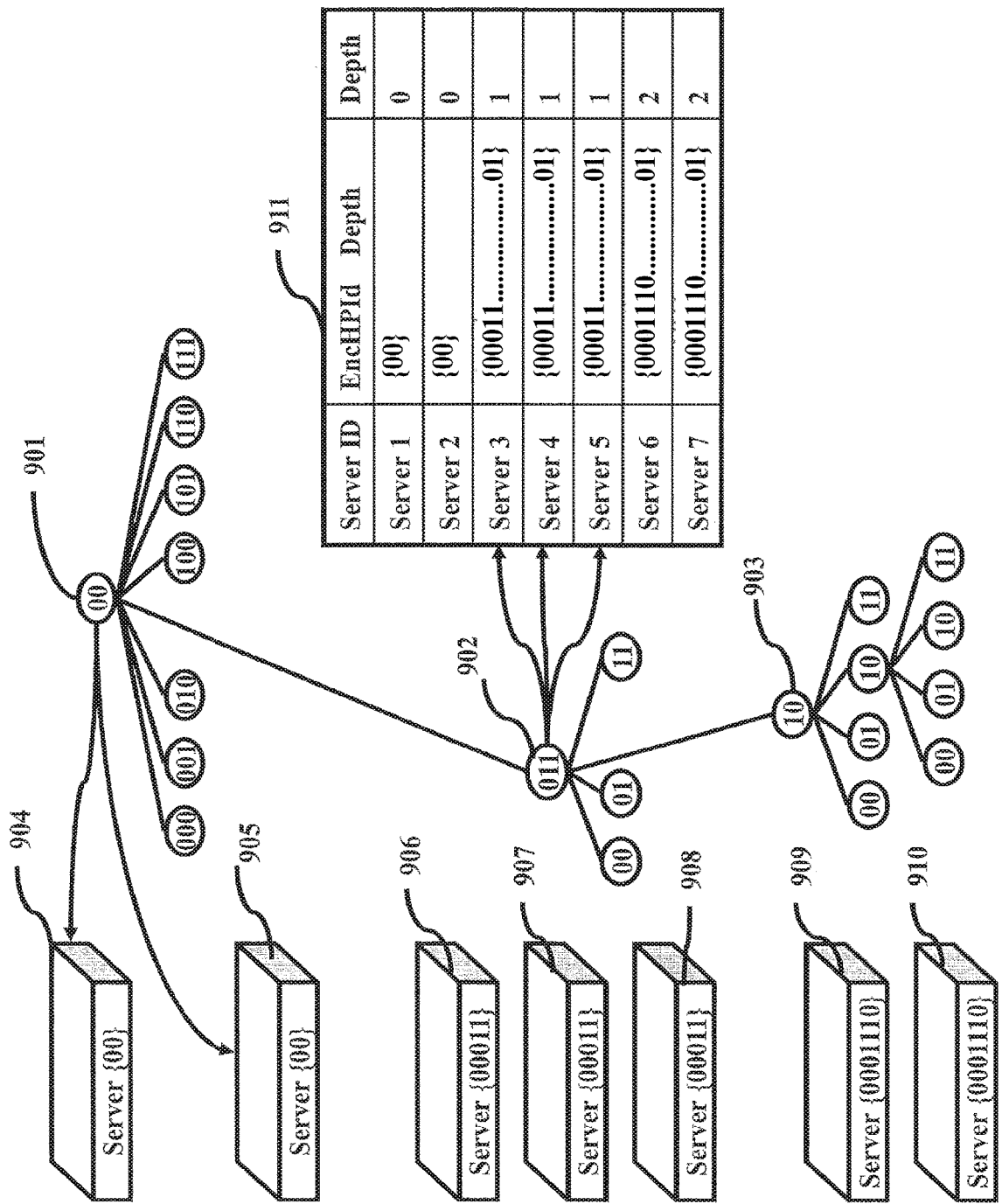
FIG. 9 shows how a data space and corresponding data index can be distributed across multiple compute resources using a map of resources to encrypted hierarchical path identifiers according to various embodiments.

FIG. 9 illustrates how a data space and corresponding data index can be distributed across multiple compute resources according to various embodiments. A map 911 shows how portions of the tree structure and corresponding data space are assigned to branches of the data index. The root partition {00} is assigned to server 904 and to server 905. Branch 902 {00011} has three servers assigned, server 906, server 907, and server 908. Branch 903 {0001110} has server 909 and server 910 assigned. This distribution method allows for massive parallelism. For example, according to this method data index can be operated upon in parallel. The use of hierarchical path identifiers makes this possible since they can be computed independently from the data index. They can be computed and then with knowledge of the map 911, a client can determine which server or set of servers to direct their operations. This works for mutations, transactions, queries and other operations. However, the use of plaintext hierarchical path identifiers to map plaintext data tuples to the servers would leak information about the value of the plaintext data tuple.

According to various embodiments, encrypting the hierarchical path identifiers using a secure method as disclosed herein preserves hierarchy and allows encrypted data tuples to be distributed across multiple compute resources and searched in parallel without leaking information about the plaintext data. The system and method of searching encrypted data disclosed herein may advantageously be used to obscure location of data within a plaintext data space and allow encrypted data to be secretly distributed across any number of compute resources. Since the encrypted hierarchical path identifiers do not leak information about the location of the data within a data space, the presence of a data tuple within a server mapped to a portion of a distributed data index does not provide any indication of the location within a plaintext data space.

With continued reference to FIG. 2, in at least one embodiment, the server 202 forwards the encrypted data tuple and associated encrypted hierarchical path identifier to any number of other servers 201. In other embodiments, the functions of generating hierarchical path identifiers, storing and indexing the encrypted data tuples, and searching the encrypted data tuples could be distributed over any number of computers, storage devices, networks, data centers, or locations. It is to be appreciated that the client 201 and server 202 are not necessarily a client/server configuration. A client 201 may be any device that communicates with the server 202 in order to perform data management operations, such as implementing a portion thereof. In some embodiments, client 201 does not communicate directly with the server 202 but may communicate through multiple tiers, computers or devices such as proxies, gateways, or other network devices. A client 201, for example, could be a computer, laptop, tablet, smart TV, set top box, smart phone, an Internet of Things device, or any other device with a processor and communications mechanism.

Figure 10:
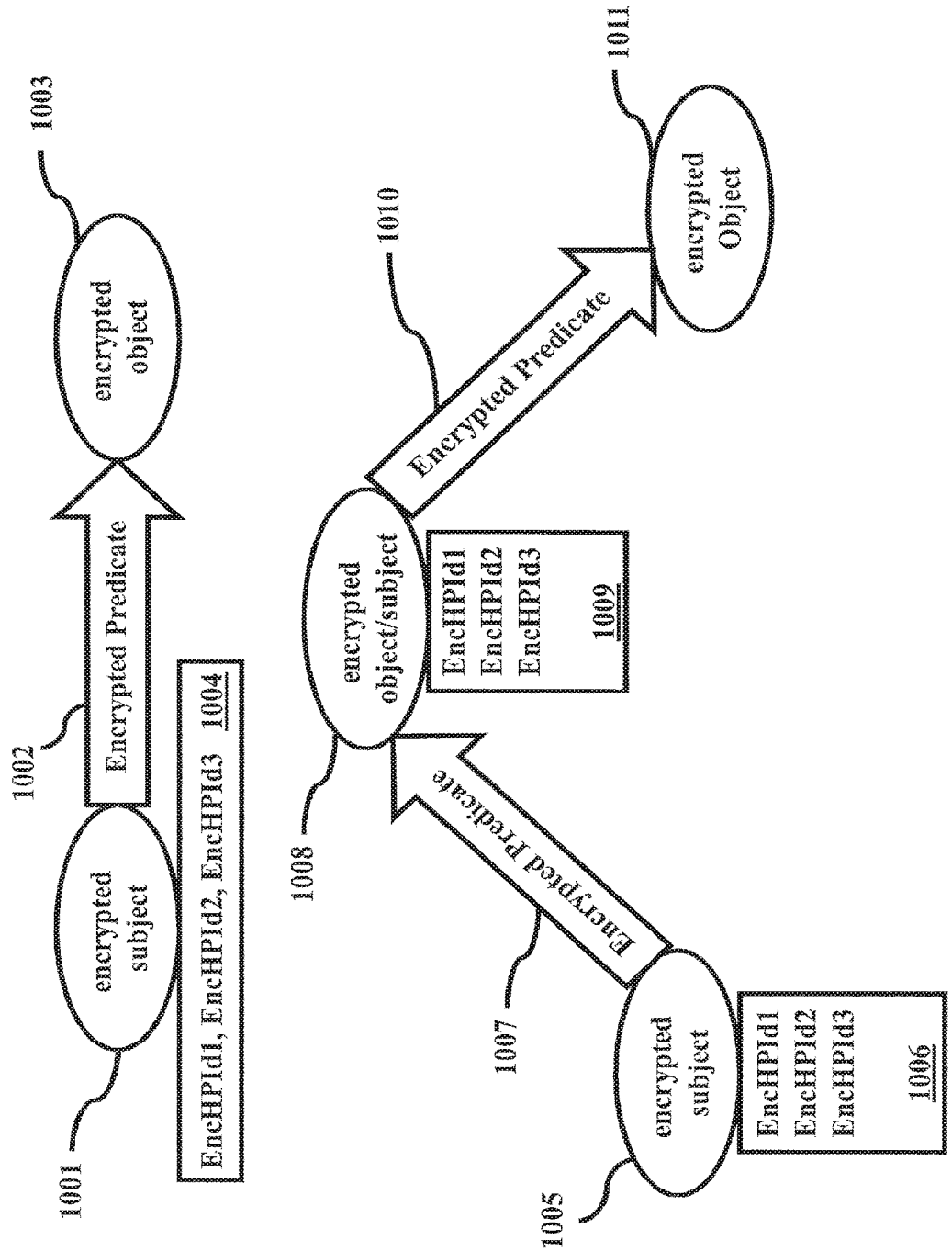
FIG. 10 shows an exemplary data model for supporting complex data relations according to various embodiments.

FIG. 10 illustrates a further embodiment that includes a data model that supports additional encrypted data operations beyond the selection of candidate results using encrypted hierarchical path identifiers. Each data tuple may include a set of values including a subject, predicate, object, literal flag, and security label. In an encrypted data tuple, some or all of these elements may be encrypted. For example, a semantic triple may be used which includes a type of 3-tuple consisting of a subject, predicate, and object. FIG. 10 shows an encrypted 3-tuple consisting of an encrypted subject 1001, an encrypted predicate 1002, and an encrypted object 1003.

Semantic triples can be used to express relations between a subject and an object. The predicate indicates the type of that relation. Rich graphs of information can be formed through semantic triples. In at least one embodiment, using an N-tuple that also has a subject, predicate, and object allows for the same types of queries and graph operations as can be performed with semantic triples. Encrypted subject 1005 is related to encrypted object 1008 by encrypted predicate 1007. Encrypted object 1008 is further related to encrypted object 1011 by encrypted predicate 1010. Encrypted subject 1001 is associated with three different encrypted hierarchical path identifiers 1004. Encrypted subject 1005 is associated with three different encrypted hierarchical path identifiers 1006. Encrypted subject 1008 is associated with three different encrypted hierarchical path identifiers 1009.

With further reference to FIG. 2, the system 200 may be configured to operate on such associated hierarchical path identifiers wherein server 202 uses the associated encrypted hierarchical path identifiers to index and store the tuples. In at least one embodiment, the system 200 uses encrypted data tuples instead of simple encrypted data rows because of this ability to represent complex relations and operate upon their encrypted forms without decrypting the encrypted data tuples. This allows for a schema-less encrypted data management system as well as encrypted semantic search. New types of predicates can be added at any time to store new forms of relations.

In various embodiments, each element of the data tuple may be encrypted separately and can have the same or different secret keys. These keys are not known by server 202. Encrypted subject 1001 may be encrypted separately from encrypted predicate 1002 and encrypted object 1003.

For many queries, it may be useful to perform an exact match on the subject, predicate, and even the object element. If an exact match is desired, for example, the query can contain an encrypted query subject, encrypted query predicate, and even an encrypted query object. In this case, the encrypted query subject can be matched with the encrypted subject of the data tuple to determine if the encrypted data tuple is a match to the query. The encrypted query predicate and encrypted query object can also be matched against the corresponding elements of the encrypted data tuple. In another embodiment, queries can contain lists of encrypted subjects, predicates, and/or objects. For the encrypted data tuple to match, the encrypted data tuple must have an encrypted subject, predicate, or object that is contained in one of those lists. Along with the matching of the encrypted hierarchical path identifiers, the ability to further match the encrypted data may greatly enhance the efficiency and functionality of the encrypted queries since it reduces the number of encrypted data tuples returned to the client 201 for decryption and plaintext query evaluation. For instance, an encrypted spatial query could be performed that finds all candidate shapes within an area. The server 202 can then further filter the candidate shapes based on a specific predicate. The predicate is encrypted, but if the encrypted search predicate and the encrypted predicate for a data tuple match, then they have the same plaintext predicate. Matching encrypted data elements means that they have the same bytes. The plaintext predicate is still a secret to server 202 but the number of candidates sent back to client 201 has been reduced.

In other embodiments, encrypted data tuples can have different numbers of elements. For instance, a data tuple may include only a subject, predicate or object. In other embodiments, an encrypted data tuple could be an entire encrypted row, a row with some or all of the cells encrypted separately, or a row with some or all of the cells encrypted separately with their own secret key. In other embodiments, an encrypted data tuple could represent an entry or set of entries in a column-oriented data management scheme.

In at least one embodiment, each encrypted data tuple is associated with a security label. That label allows the server 202 to determine if a client 201 has permission to access for read or write a given encrypted data tuple. In one embodiment, the security label may specify the level, compartment, and group that controls access to the encrypted data tuple. The server 202 may be configured to not send the encrypted data tuple to any user without authorization to the data tuple's level, compartment, and group. Server 202 can read the security label for a tuple without decrypting the rest of the data tuple. In one embodiment, the security label may be plaintext. In other embodiments, the security label can be encrypted using a shared key that both server 202 and client 201 possess. In another embodiment, the client 201 can encrypt the security label using a public key corresponding to the private key possessed by server 202. Thus, the security label may provide an exception to not sharing keys and communication of only encrypted data between the server 202 and client 201 within the performance of the encrypted data operation. Security labels are evaluated on the server 202 and further help filter the candidate results returned to client 201.

Figure 11:
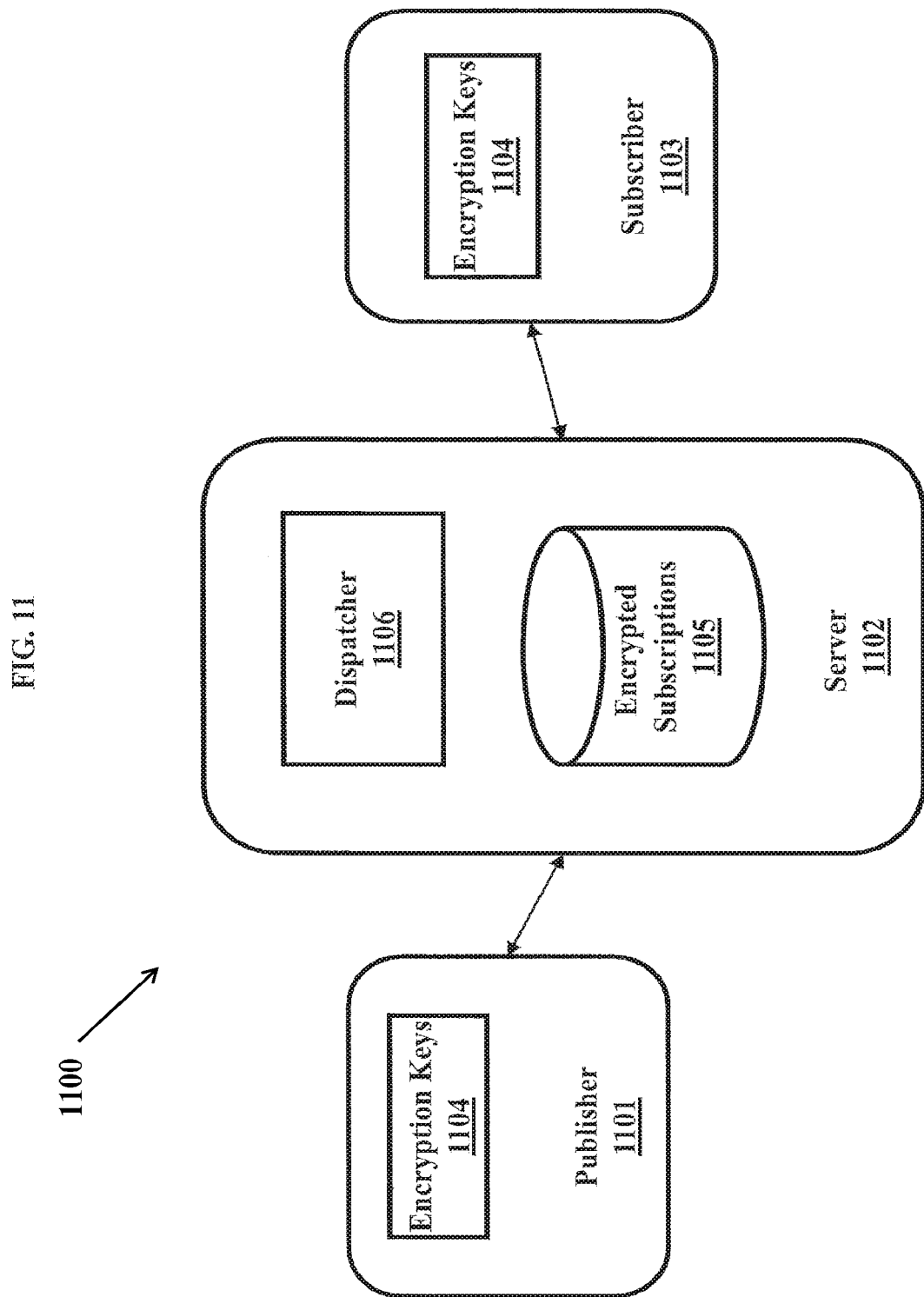
FIG. 11 shows an exemplary encrypted messaging system and method with encrypted content filtering according to various embodiments.

FIG. 11 shows another exemplary encrypted and efficient data management method and system 1100. This data management method and system 1100 utilizes encrypted hierarchical path identifiers for efficient encrypted publishing and subscribing to encrypted messages. This may include message queues and topics. In this configuration, the encrypted data operations include message dissemination and content filtering. For example, messages, in the form of encrypted data tuples, are published by publisher 1101. Publisher 1101 has access to encryption keys 1104. Subscriber 1103 may be interested in receiving encrypted data tuples from publishers. Subscriber 1103 has access to encryption keys 1104. Server 1102 does not have access to encryption keys. Subscriber 1103 may subscribe to encrypted messages by sending encrypted hierarchical path identifiers and encrypted data subscriptions to server 1102. Publisher 1101 may generate different plaintext hierarchical path identifiers for example using the method shown in FIG. 5 and FIG. 6, based on the plaintext message to be published and the attributes of the message that subscribers may wish to filter on. Publisher 1101 may encrypt the different hierarchical path identifiers, for example using the method shown in FIG. 7. Publisher 1101 encrypts the plaintext message using encryption keys 1104 and sends the encrypted message and the encrypted hierarchical path identifiers to server 1102.

System 1100 is another example of an efficient and secure data management system and method enabled by using encrypted hierarchical path identifiers. In this embodiment, server 1102 receives the encrypted message and the encrypted hierarchical path identifiers. The encrypted subscriptions 1105 are stored in server 1102 and indexed by the encrypted hierarchical path identifiers. As encrypted data tuples are published to server 1102, the system 1100 may query or search for matching encrypted subscriptions 1105. For example, dispatcher 1106 may search encrypted subscriptions 1105 for encrypted subscriptions that are associated with encrypted hierarchical path identifiers that match those received with the encrypted message. Exemplary matches may include exact match as well as range, bounding, and intersection matches. In at least one embodiment, multiple different hierarchical path identifiers can be provided by the publisher 1101 for each attribute to improve the selectivity of the encrypted subscription search. The encrypted elements of the encrypted subscriptions 1105 may be further evaluated to determine if they match any of the encrypted attributes of the message. Dispatcher 1106 may then send the encrypted message to subscribers that have a matching encrypted subscription. An advantage of this method and system 1100 of data management is that subscriber 1103 can subscribe to a subset of encrypted messages and server 1102 does not have to decrypt the messages to determine if they match a subscription. Server 1102 does not know or have access to the encryption keys 1107 and never sees any plaintext data.

Figure 12:
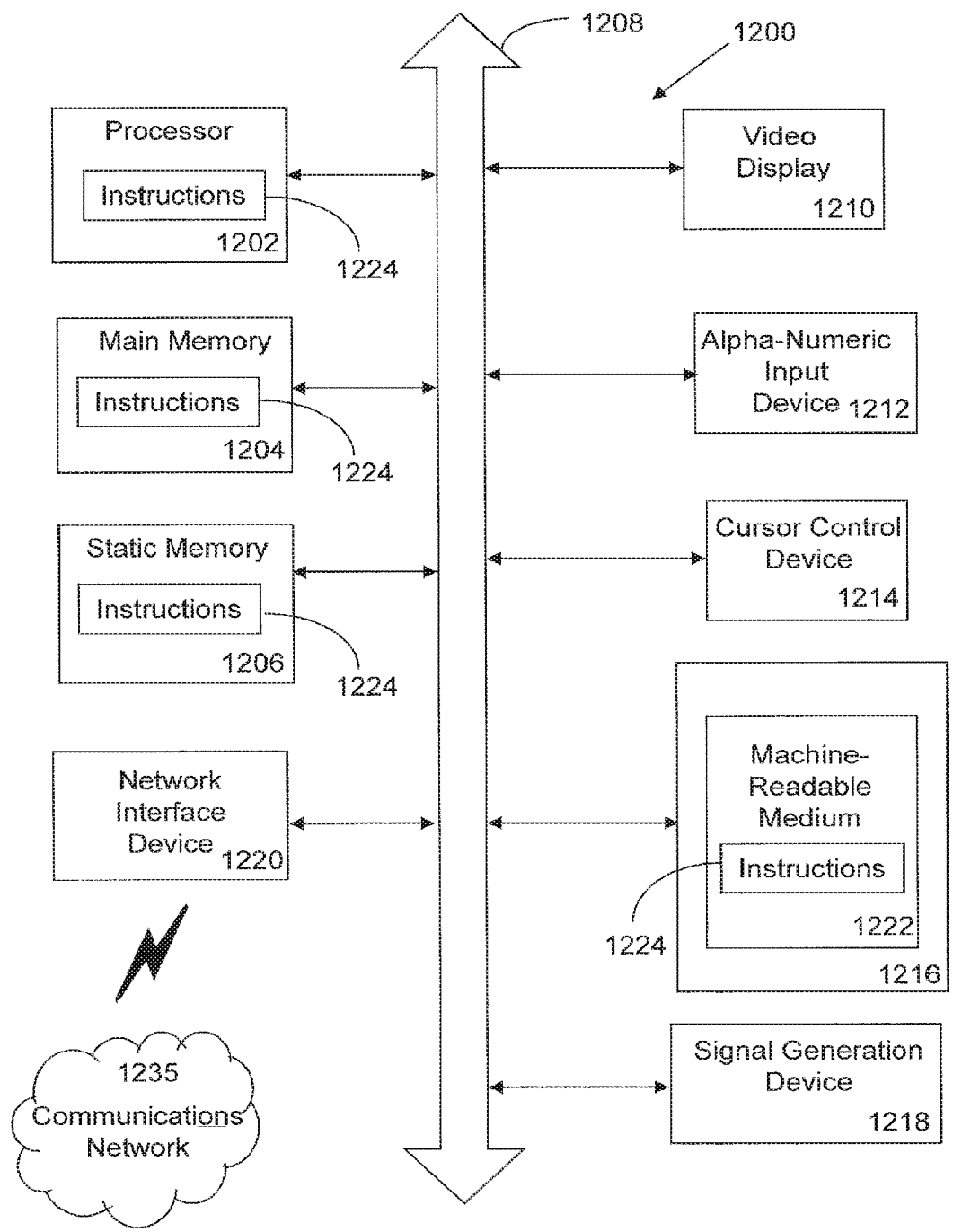
FIG. 12 is a schematic diagram of a machine in the form of a computer system within which a set of instructions, when executed, may cause the machine to perform any one or more of the methodologies or operations of the systems and methods for providing secure encrypted data management.

Referring now also to FIG. 12, at least a portion of the methodologies and techniques described with respect to the exemplary embodiments of the method and system 200/1100 can incorporate a machine, such as, but not limited to, computer system 1200, or other computing device within which a set of instructions, when executed, may cause the machine to perform any one or more of the methodologies or functions discussed above. The machine may be configured to facilitate various operations conducted by the system 200/1100. For example, the machine may be configured to, but is not limited to, assist the system 200/1100 by providing processing power to assist with processing loads experienced in the system 200/1100, by providing storage capacity for storing instructions or data traversing the system 200/1100, or by assisting with any other operations conducted by or within the system 200/1100.

In some embodiments, the machine may operate as a standalone device. In some embodiments, the machine may be connected (e.g., using communications network 1235, another network, or a combination thereof) to and assist with operations performed by other machines and systems. The machine may be connected with any component in the system 200/1100. In a networked deployment, the machine may operate in the capacity of a server or a client, such as a client user machine, in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1200 may include a processor 1202 (e.g., a central processing unit (CPU), a graphics processing unit (GPU, or both), a main memory 1204 and a static memory 1206, which communicate with each other via a bus 1208. The computer system 1200 may further include a video display unit 1210, which may be, but is not limited to, a liquid crystal display (LCD), a flat panel, a solid state display, or a cathode ray tube (CRT). The computer system 1200 may include an input device 1212, such as, but not limited to, a keyboard, a cursor control device 1214, such as, but not limited to, a mouse, a disk drive unit 1216, a signal generation device 1218, such as, but not limited to, a speaker or remote control, and a network interface device 1220.

The disk drive unit 1216 may include a machine-readable medium 1222 on which is stored one or more sets of instructions 1224, such as, but not limited to, software embodying any one or more of the methodologies or functions described herein, including those methods illustrated above. The instructions 1224 may also reside, completely or at least partially, within the main memory 1204, the static memory 1206, or within the processor 1202, or a combination thereof, during execution thereof by the computer system 1200. The main memory 1204 and the processor 1202 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 1222 containing instructions 1224 so that a device connected to the communications network 1235, another network, or a combination thereof, can send or receive voice, video or data, and to communicate over the communications network 1235, another network, or a combination thereof, using the instructions. The instructions 1224 may further be transmitted or received over the communications network 1235, another network, or a combination thereof, via the network interface device 1220.

While the machine-readable medium 1222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device, or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

What is claimed is:

1. A system for implementing a data operation, the system comprising:
   a memory that stores instructions; and
   a processor that executes the instructions to perform operations, the operations comprising:
   generating an encrypted hierarchical path identifier corresponding to a hierarchical data space for at least one plaintext data operation that preserves a hierarchy of the hierarchical data space, wherein the at least one plaintext data operation corresponds to at least one subdivision of the hierarchical data space;
   sending a request to perform a data operation to a server, wherein the request comprises the data operation and the encrypted hierarchical path identifier,
   wherein the operation of generating the encrypted hierarchical path identifier comprises:
   determining the at least one subdivision to which the at least one plaintext data operation corresponds;
   calculating a secret permutation for each of the at least one subdivision; and
   generating an encrypted label for each of the at least one subdivision using the corresponding secret permutation.

2. The system of claim 1, wherein the calculating a secret permutation for each of the at least one subdivision uses the parent hierarchical path identifier of the at least one subdivision as a parameter.

3. The system of claim 1, wherein the determining the at least one subdivision that corresponds to the at least one plaintext operation comprises recursively subdividing a data space into at least two levels of irregular subdivision.

4. The system of claim 1, wherein the data operation comprises a data tuple comprising at least one encrypted row.

5. The system of claim 1, wherein the data operation comprises a data tuple comprising at least one row comprising at least one encrypted cell.

6. The system of claim 1, wherein the data operation comprises a data tuple comprising a subject, predicate, and object.

7. The system of claim 1, wherein the data operation comprises a data tuple comprising at least one entry in a column.

8. The system of claim 1, wherein the data operation comprises a data tuple comprising at least one element encrypted using a first encryption key and an at least one second element encrypted using a second encryption key.

9. The system of claim 1, wherein the data operation comprises a data tuple associated with at least one security label.

10. The system of claim 1, wherein the data operation comprises a request to publish a message.

11. The system of claim 1, wherein the data operation comprises a message subscription.

12. The system of claim 1, the system further comprising:
    receiving at least one message and a first encrypted hierarchical path identifier from a client;
    determining at least one subscription that matches the first encrypted hierarchical path identifier; and
    sending the at least one message to the subscriber specified in the at least one subscription.

13. The system of claim 12, wherein the operations further comprise:
    receiving a second different encrypted hierarchical path identifier associated with the at least one message;
    searching for subscriptions that are associated with a first encrypted hierarchical path identifier that matches the first encrypted hierarchical path identifier;
    searching for subscriptions that are associated with the second different encrypted hierarchical path identifier that matches the second different encrypted hierarchical path identifier; and
    sending the at least one message to the subscribers specified by the subscriptions identified in the search.

14. The system of claim 1, further comprising:
    receiving at least one subscription and a first encrypted hierarchical path identifier from a client;
    finding at least one data index node of at least one data index using the first encrypted hierarchical path identifier; and
    storing the at least one subscription in the at least one data index node.

15. A method for implementing a data operation, the method comprising:
    generating, by utilizing instructions from a memory that are executed by a processor, an encrypted hierarchical path identifier corresponding to a hierarchical data space for at least one plaintext data operation that preserves the hierarchy of the hierarchical data space, wherein the at least one plaintext data operation corresponds to at least one subdivision of the hierarchical data space;
    sending a request to perform a data operation to a server, wherein the request comprises the data operation and the encrypted hierarchical path identifier,
    determining the at least one subdivision to which the at least one plaintext data operation corresponds;
    calculating a secret permutation for each of the at least one subdivision; and
    generating an encrypted label for each of the at least one subdivision using the corresponding secret permutation.

16. The method of claim 15, wherein the calculating a secret permutation for each of the at least one subdivision uses the parent hierarchical path identifier of the at least one subdivision as a parameter.

17. The method of claim 15, wherein the determining the at least one subdivision that corresponds to the at least one plaintext operation comprises recursively subdividing a data space into at least two levels of irregular subdivision.

18. The method of claim 15, wherein the data operation comprises a data tuple comprising at least one encrypted row.

19. The method of claim 15, wherein the data operation comprises a data tuple comprising at least one row comprising at least one encrypted cell.

20. The method of claim 15, wherein the data operation comprises a data tuple comprising a subject, predicate, and object.

21. The method of claim 15, wherein the data operation comprises a data tuple comprising at least one entry in a column.

22. The method of claim 15, wherein the data operation comprises a data tuple comprising at least one element encrypted using a first encryption key and an at least one second element encrypted using a second encryption key.

23. The method of claim 15, wherein the data operation comprises a data tuple associated with at least one security label.

24. The method of claim 15, wherein the data operation comprises a request to publish a message.

25. The method of claim 15, wherein the data operation comprises a message subscription.

26. The method of claim 15, further comprising:
receiving at least one message and a first encrypted hierarchical path identifier from a client;
determining, by utilizing instructions from a memory that are executed by a processor, the subscriptions that match the first encrypted hierarchical path identifier; and
sending the at least one message to the subscribers specified by the subscriptions.

27. The method of claim 26, the method further comprises:
receiving a second different encrypted hierarchical path identifier associated with the at least one message;
searching for subscriptions that are associated with a first encrypted hierarchical path identifier that match the first encrypted hierarchical path identifier;
searching for subscriptions that are associated with the second different encrypted hierarchical path identifier that match the second different encrypted hierarchical path identifier; and
sending the at least one message to the subscribers specified by the subscriptions identified in the search.

28. The method of claim 15, further comprising:
receiving at least one subscription and a first encrypted hierarchical path identifier from a client;
finding, by utilizing instructions from a memory that are executed by a processor, at least one data index node of at least one data index using the first encrypted hierarchical path identifier; and
storing the at least one subscription in the at least one data index node.

29. A non-transitory computer readable device, which when loaded and executed by a processor, causes the processor to perform operations comprising:
generating an encrypted hierarchical path identifier corresponding to a hierarchical data space for at least one plaintext data operation that preserves a hierarchy of the hierarchical data space, wherein the at least one plaintext data operation corresponds to at least one subdivision of the hierarchical data space;
sending a request to perform a data operation to a server, wherein the request comprises the data operation and the encrypted hierarchical path identifier, wherein the operation of generating the encrypted hierarchical path identifier comprises:
determining the at least one subdivision to which the at least one plaintext data operation corresponds;
calculating a secret permutation for each of the at least one; and
generating an encrypted label for each of the at least one subdivision using the corresponding secret permutation.

30. The computer readable device of claim 29, wherein the calculating a secret permutation for each of the at least one subdivision uses the parent hierarchical path identifier of the at least one subdivision as a parameter.

31. The computer readable device of claim 29, wherein the determining the at least one subdivision that corresponds to the at least one plaintext operation comprises recursively subdividing a data space into at least two levels of irregular subdivision.

32. The computer readable device of claim 29, wherein the data operation comprises a data tuple comprising at least one encrypted row.

33. The computer readable device of claim 29, wherein the data operation comprises a data tuple comprising at least one row comprising at least one encrypted cell.

34. The computer readable device of claim 29, wherein the data operation comprises a data tuple comprising a subject, predicate, and object.

35. The computer readable device of claim 29, wherein the data operation comprises a data tuple comprising at least one entry in a column.

36. The computer readable device of claim 29, wherein the data operation comprises a data tuple comprising at least one element encrypted using a first encryption key and an at least one second element encrypted using a second encryption key.

37. The computer readable device of claim 29, wherein the data operation comprises a data tuple associated with at least one security label.

38. The computer readable device of claim 29, wherein the data operation comprises a request to publish at least one message.

39. The computer readable device of claim 29, wherein the data operation comprises a message subscription.

* * * * *